(12) United States Patent
Aarre

(10) Patent No.: US 9,841,518 B2
(45) Date of Patent: Dec. 12, 2017

(54) NOISE ATTENUATION

(71) Applicant: Schlumberger Technology Corporation, Sugar Land, TX (US)

(72) Inventor: Victor Aarre, Stavanger (NO)

(73) Assignee: Schlumberger Technology Corporation, Sugar Land, TX (US)

(*) Notice: Subject to any disclaimer, the term of this patent is extended or adjusted under 35 U.S.C. 154(b) by 396 days.

(21) Appl. No.: 14/575,530

(22) Filed: Dec. 18, 2014

(65) Prior Publication Data

US 2015/0241584 A1  Aug. 27, 2015

Related U.S. Application Data

(60) Provisional application No. 61/944,901, filed on Feb. 26, 2014.

(51) Int. Cl.
*G01V 1/00* (2006.01)
*G01V 1/36* (2006.01)

(52) U.S. Cl.
CPC .............. *G01V 1/36* (2013.01); *G01V 1/364* (2013.01); *G01V 2210/32* (2013.01)

(58) Field of Classification Search
CPC ....... G01V 1/36; G01V 1/364; G01V 2210/32
See application file for complete search history.

(56) References Cited

U.S. PATENT DOCUMENTS

| | | | | |
|---|---|---|---|---|
| 5,067,112 A | * | 11/1991 | Meek | G01V 1/364 367/43 |
| 5,671,136 A | * | 9/1997 | Willhoit, Jr. | G01V 1/30 702/18 |
| 8,463,551 B2 | | 6/2013 | Aarre | |
| 2003/0078734 A1 | | 4/2003 | Ozbek | |
| 2007/0076525 A1 | | 4/2007 | Craft et al. | |
| 2009/0276159 A1 | | 11/2009 | Strobbia | |
| 2011/0118985 A1 | | 5/2011 | Aarre | |
| 2015/0109882 A1 | * | 4/2015 | Rentsch-Smith | G01V 1/364 367/14 |

FOREIGN PATENT DOCUMENTS

| | | |
|---|---|---|
| EP | 0681193 B1 | 8/1999 |
| WO | 2013163131 A1 | 10/2013 |

OTHER PUBLICATIONS

PCT/US2015/014535 International Search Report and Written Opinion, dated May 12, 2015, 14 pgs.

(Continued)

*Primary Examiner* — Krystine E Breier
(74) *Attorney, Agent, or Firm* — Alec J. McGinn

(57) ABSTRACT

A method can include receiving data that includes signal data and coherent noise data where the signal data includes signal data that corresponds to a multidimensional physical structure; generating filtered data by filtering at least a portion of the data to attenuate at least a portion of the coherent noise data by applying a multidimensional geometric coherent noise model defined by at least one geometric parameter; and assessing a portion of the signal data in the generated filtered data to characterize the multidimensional physical structure.

20 Claims, 17 Drawing Sheets

(56) References Cited

OTHER PUBLICATIONS

Chopra and Marfurt, Seismic Attributes for Prospect Identification and Reservoir Characterization, 2007, Chapter 8, Structure-oriented Filtering and Image Enhancement. Seismic Attributes for Prospect Identification and Reservoir Characterization: pp. 187-203 (Scan is 9 pages).

Yilmaz, of Seismic Data Analysis: Processing, Inversion, and Interpretation of Seismic Data, vol. 1, 2001 (SEG), F-K filtering at pp. 898-919 and Tau-p (slant-stack transform) at pp. 920-937 (Scan is 20 pages).

BroadSeis, Wavelts without Sidelobes, Aug. 15, 2013 (2 pages).

Karsli et al., A procedure to reduce side lobes of reflection of reflection wavelets:A contribution to low frequency information, Abstract, Journal of Applied Geophysics, vol. 96, Sep. 2013, pp. 107-118 (1 page, Abstract only).

Soubaras et al., BroadSeis: Enhancing interpretation and inversion with broadband marine seismic, CSEG Recorder, Sep. 2012, pp. 40-46 (6 pages).

Hale, Methods to compute fault images, extract fault surfaces and estimate fault throws from 3D seismic images, Geophysics, vol. 78, No. 2 (Mar.-Apr. 2013); p. O33-O43 (11 pages).

Ryan, Ricker, Ormsby; Klauder, Butterworth—A Choice of Wavelets, CSEG Recorder, Sep. 1994, pp. 8-9 (2 pages).

MathWorks, Inc., Matlab Wavelet Toolbox, User's Guide, Table of Contents, Mar. 2014 (13 pages).

\* cited by examiner

NOISE ATTENUATION

RELATED APPLICATIONS

This application claims priority to and the benefit of U.S. Provisional Patent Application No. 61/944,901, filed 26 Feb. 2014, which is incorporated by reference herein.

BACKGROUND

Seismic interpretation is a process that may examine seismic data (e.g., location and time or depth) in an effort to identify subsurface structures such as horizons and faults. Structures may be, for example, faulted stratigraphic formations indicative of hydrocarbon traps or flow channels. In the field of resource extraction, enhancements to seismic interpretation can allow for construction of a more accurate model, which, in turn, may improve seismic volume analysis for purposes of resource extraction. Various techniques described herein pertain to processing of seismic data, for example, for analysis of such data to characterize one or more regions in a geologic environment and, for example, to perform one or more operations (e.g., field operations, etc.).

SUMMARY

A method can include receiving data that includes signal data and coherent noise data where the signal data includes signal data that corresponds to a multidimensional physical structure; generating filtered data by filtering at least a portion of the data to attenuate at least a portion of the coherent noise data by applying a multidimensional geometric coherent noise model defined by at least one geometric parameter; and assessing a portion of the signal data in the generated filtered data to characterize the multidimensional physical structure. A system can include a processor; memory operatively coupled to the processor; and at least one module that includes processor-executable instructions stored in the memory to instruct the system where the instructions include instructions to receive data that includes signal data and coherent noise data where the signal data includes signal data that corresponds to a multidimensional physical structure; generate filtered data by filtering at least a portion of the data to attenuate at least a portion of the coherent noise data by applying a multidimensional geometric coherent noise model defined by at least one geometric parameter; and assess a portion of the signal data in the generated filtered data to characterize the multidimensional physical structure. A computer-readable storage medium can include computer-executable instructions to instruct a computer where the instructions include instructions to receive data that includes signal data and coherent noise data where the signal data includes signal data that corresponds to a multidimensional physical structure; generate filtered data by filtering at least a portion of the data to attenuate at least a portion of the coherent noise data by applying a multidimensional geometric coherent noise model defined by at least one geometric parameter; and assess a portion of the signal data in the generated filtered data to characterize the multidimensional physical structure. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
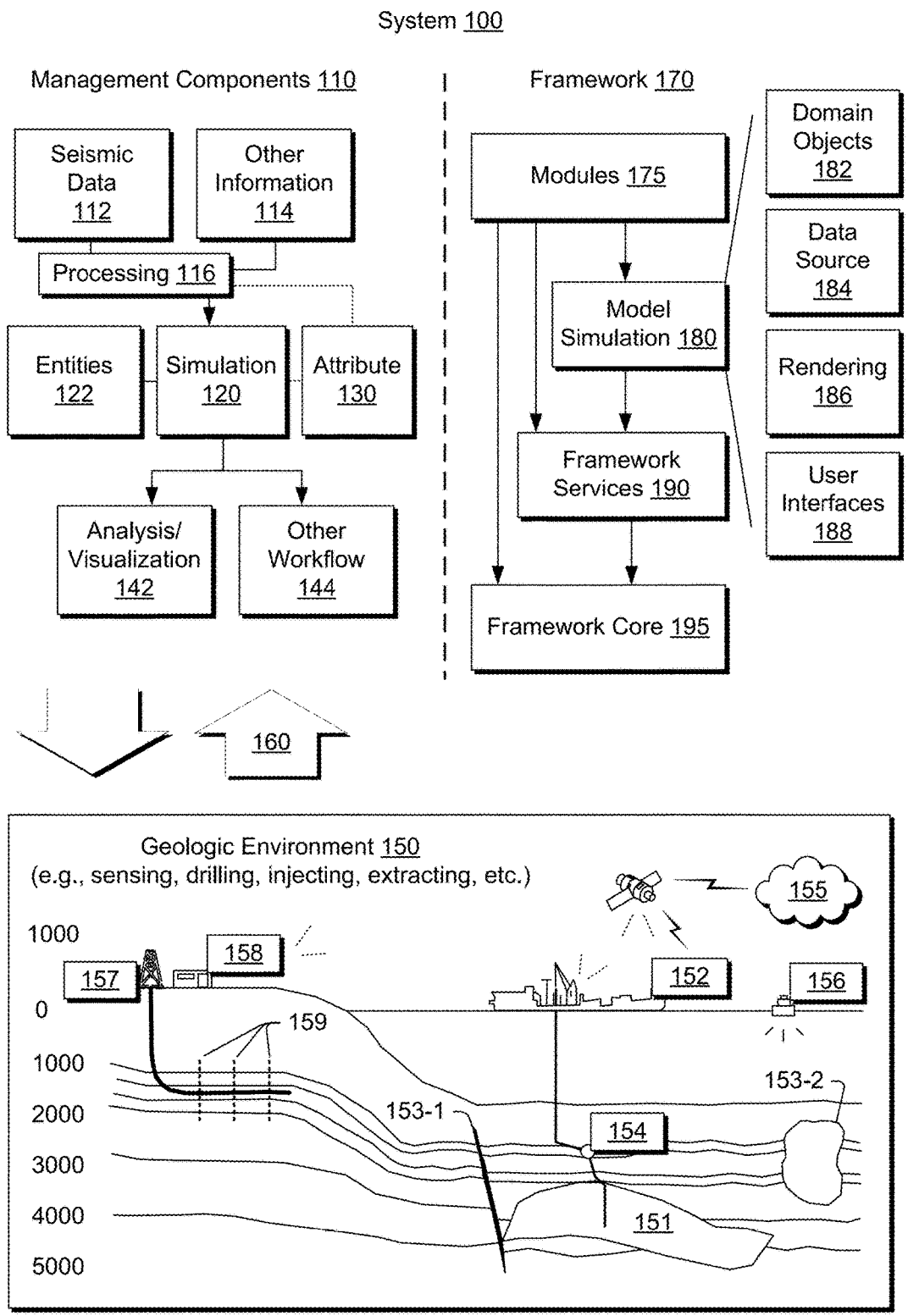
FIG. 1 illustrates an example system that includes various components for modeling a geologic environment and various equipment associated with the geologic environment.

This description is not to be taken in a limiting sense, but rather is made merely for the purpose of describing the general principles of the implementations. The scope of the described implementations should be ascertained with reference to the issued claims.

Seismic interpretation is a process that involves examining seismic data (e.g., with respect to location and time or depth) to identify one or more types of subsurface structures (e.g., horizons, faults, geobodies, etc.). When performing seismic interpretation, seismic data may be provided in the form of traces where, for example, each trace is an amplitude versus time recording of energy emitted by a source that has interacted with various subsurface structures. An interpretation process may involve visual display of seismic data and interaction using one or more tools (e.g., executable instruction modules stored in memory and executed by one or more processors). An interpretation process may consider vertical seismic sections, inline and crossline directions, horizontal seismic sections called horizontal time slices, etc. Seismic data may optionally be interpreted with other data such as, for example, well log data. As an example, a process may include performing an inversion to generate a model. For example, seismic data and optionally other data may be used in a method that includes by solving an inverse problem to generate a model of a subsurface region. Such a model may be, for example, an acoustic impedance model and/or other type of model.

As an example, an interpretation process may include receiving seismic data from a data store (e.g., via a network or other connection). Seismic data may be formatted according to one of the SEG-Y format standards (Society of Exploration Geophysicists), the ZGY format standard (e.g., a bricked format) or another format. As an example, seismic data may be stored with trace header information, which may assist in analysis of the seismic data. Seismic data may optionally be accessed, for example, according to a number of traces (e.g., in an inline, crossline or inline and crossline directions), which may be entire traces or portions thereof (e.g., for one or more particular times or depths). As an example, given a number of traces across a region, a process may access some of those traces in a sub-region by specifying inline and crossline indexes (e.g., or geographic or grid coordinates) as well as a time or depth window.

A process may include determining one or more seismic attributes. A seismic attribute may be considered, for example, a way to describe, quantify, etc., characteristic content of seismic data. As an example, a quantified characteristic may be computed, measured, etc., from seismic data. A seismic attribute may be a rate of change of a quantity (or quantities) with respect to time, space or both time and space. As an example, a seismic attribute may provide for examination of seismic data in an amplitude domain, in a time domain, or in another manner. As an example, a seismic attribute may be based on another seismic attribute (e.g., a second derivative seismic attribute may be based on a first derivative seismic attribute, etc.).

A framework may include modules (e.g., processor-executable instructions stored in memory) to determine one or more seismic attributes. Seismic attributes may optionally be classified, for example, as volume attributes or surface attributes or one-dimensional attributes. As an example, a volume attribute may be an attribute computed from a seismic cube and may result in a new seismic cube that includes information pertaining to the volume attribute. As an example, a surface attribute may be a value associated with a surface of a seismic cube that includes information pertaining to a volume attribute.

A seismic interpretation may be performed using displayable information, for example, by rendering information to a display device, a projection device, a printing device, etc. As an example, one or more color schemes (e.g., optionally including black and white or greyscale) may be referenced for displayable information to enhance visual examination of the displayable information. A color scheme may include a palette, a range, etc. A look-up-table (LUT) or other data structure, function (e.g., linear or non-linear), etc., may allow for mapping of values associated with one or more seismic attributes to intensity, colors (e.g., RGB, YCbCr, etc.), etc. Where the human eye will be used or is used for viewing displayable information, a display scheme may be selected to enhance interpretation (e.g., to increase contrast, provide for blinking, etc.).

A module for determining one or more seismic attributes may include one or more parameters. As an example, a module may include one or more parameters that may be set via a graphical user interface (GUI), a specification file, etc. In such an example, an interpreter may wish to examine a seismic attribute for seismic data using one or more values of a parameter. As an example, such a module may provide a default value and a field, graphical control, etc., that allows for input of a value other than the default value.

As an example, seismic interpretation may be performed using seismic to simulation software such as the PETREL® seismic to simulation software framework (Schlumberger Limited, Houston, Tex.), which includes various features to perform attribute analyses (e.g., with respect to a 3D seismic cube, a 2D seismic line, etc.). While the PETREL® seismic to simulation software framework is mentioned, other types of software, frameworks, etc., may be employed for purposes of attribute analyses.

FIG. 1 shows an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
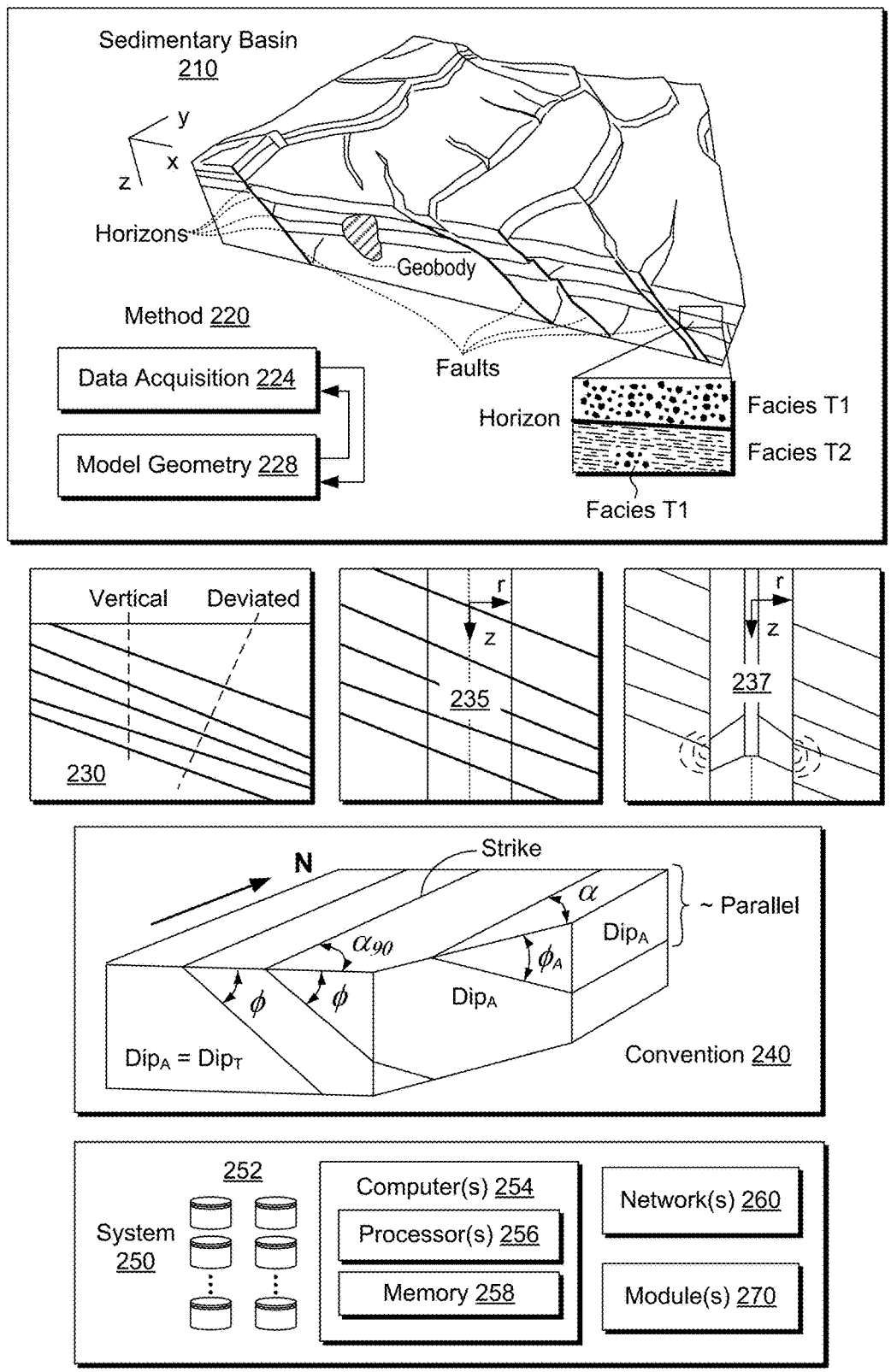
FIG. 2 illustrates an example of a sedimentary basin, an example of a method, an example of a formation, an example of a borehole, an example of a borehole tool, an example of a convention and an example of a system.

FIG. 2 shows an example of a sedimentary basin 210 (e.g., a geologic environment), an example of a method 220 for model building (e.g., for a simulator, etc.), an example of a formation 230, an example of a borehole 235 in a formation, an example of a convention 240 and an example of a system 250.

As an example, reservoir simulation, petroleum systems modeling, etc. may be applied to characterize various types of subsurface environments, including environments such as those of FIG. 1.

In FIG. 2, the sedimentary basin 210, which is a geologic environment, includes horizons, faults, one or more geobodies and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 220 includes a data acquisition block 224 and a model geometry block 228. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling, quantities such as temperature, pressure and porosity distributions within the sediments may be modeled, for example, by solving partial differential equations (PDEs) using one or more numerical techniques. Modeling may also model geometry with respect to time, for example, to account for changes stemming from geological events (e.g., deposition of material, erosion of material, shifting of material, etc.).

A commercially available modeling framework marketed as the PETROMOD® framework (Schlumberger Limited, Houston, Tex.) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows.

As shown in FIG. 2, the formation 230 includes a horizontal surface and various subsurface layers. As an example, a borehole may be vertical. As another example, a borehole may be deviated. In the example of FIG. 2, the borehole 235 may be considered a vertical borehole, for example, where the z-axis extends downwardly normal to the horizontal surface of the formation 230. As an example, a tool 237 may be positioned in a borehole, for example, to acquire information. As mentioned, a borehole tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

As an example, a borehole may be vertical, deviate and/or horizontal. As an example, a tool may be positioned to acquire information in a horizontal portion of a borehole. Analysis of such information may reveal vugs, dissolution planes (e.g., dissolution along bedding planes), stress-related features, dip events, etc. As an example, a tool may acquire information that may help to characterize a fractured reservoir, optionally where fractures may be natural and/or artificial (e.g., hydraulic fractures). Such information may assist with completions, stimulation treatment, etc. As an example, information acquired by a tool may be analyzed using a framework such as the TECHLOG® framework (Schlumberger Limited, Houston, Tex.).

As to the convention 240 for dip, as shown, the three dimensional orientation of a plane can be defined by its dip and strike. Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 240 of FIG. 2, various angles φ indicate angle of slope downwards, for example, from an imaginary horizontal plane (e.g., flat upper surface); whereas, dip refers to the direction towards which a dipping plane slopes (e.g., which may be given with respect to degrees, compass directions, etc.). Another feature shown in the convention of FIG. 2 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 240 of FIG. 2). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 240 of FIG. 2). Apparent dip may be the dip of a plane as measured in any other direction except in the direction of true dip (see, e.g., $\phi_A$ as $Dip_A$ for angle $\alpha$); however, it is possible that the apparent dip is equal to the true dip (see, e.g., $\phi$ as $Dip_A=Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 240 of FIG. 2, the dip of a plane as seen in a cross-section perpendicular to the strike is true dip (see, e.g., the surface with $\phi$ as $Dip_A=Dip_T$ for angle $\alpha_{90}$ with respect to the strike). As indicated, dip observed in a cross-section in any other direction is apparent dip (see, e.g., surfaces labeled $Dip_A$). Further, as shown in the convention 240 of FIG. 2, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 240 may be used with respect to an analysis, an interpretation, an attribute, etc. (see, e.g., various blocks of the system 100 of FIG. 1). As an example, various types of features may be described, in part, by dip (e.g., sedimentary bedding, faults and fractures, cuestas, igneous dikes and sills, metamorphic foliation, etc.). As an example, dip may change spatially as a layer approaches a geobody. For example, consider a salt body that may rise due to various forces (e.g., buoyancy, etc.). In such an example, dip may trend upward as a salt body moves upward.

Seismic interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As an example, equations may be provided for petroleum expulsion and migration, which may be modeled and simulated, for example, with respect to a period of time. Petroleum migration from a source material (e.g., primary migration or expulsion) may include use of a saturation model where migration-saturation values control expulsion. Determinations as to secondary migration of petroleum (e.g., oil or gas), may include using hydrodynamic potential of fluid and accounting for driving forces that promote fluid flow. Such forces can include buoyancy gradient, pore pressure gradient, and capillary pressure gradient.

As shown in FIG. 2, the system 250 includes one or more information storage devices 252, one or more computers 254, one or more networks 260 and one or more modules 270. As to the one or more computers 254, each computer may include one or more processors (e.g., or processing cores) 256 and memory 258 for storing instructions (e.g., modules), for example, executable by at least one of the one or more processors. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252.

As an example, the one or more modules 270 may include instructions (e.g., stored in memory) executable by one or more processors to instruct the system 250 to perform various actions. As an example, the system 250 may be configured such that the one or more modules 270 provide for establishing the framework 170 of FIG. 1 or a portion thereof. As an example, one or more methods, techniques, etc. may be performed using one or more modules, which may be, for example, one or more of the one or more modules 270 of FIG. 2.

As mentioned, seismic data may be acquired and analyzed to understand better subsurface structure of a geologic environment. Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz or optionally less than 1 Hz and/or optionally more than 100 Hz). Seismic data may be processed and interpreted, for example, to understand better composition, fluid content, extent and geometry of subsurface rocks.

Figure 3:
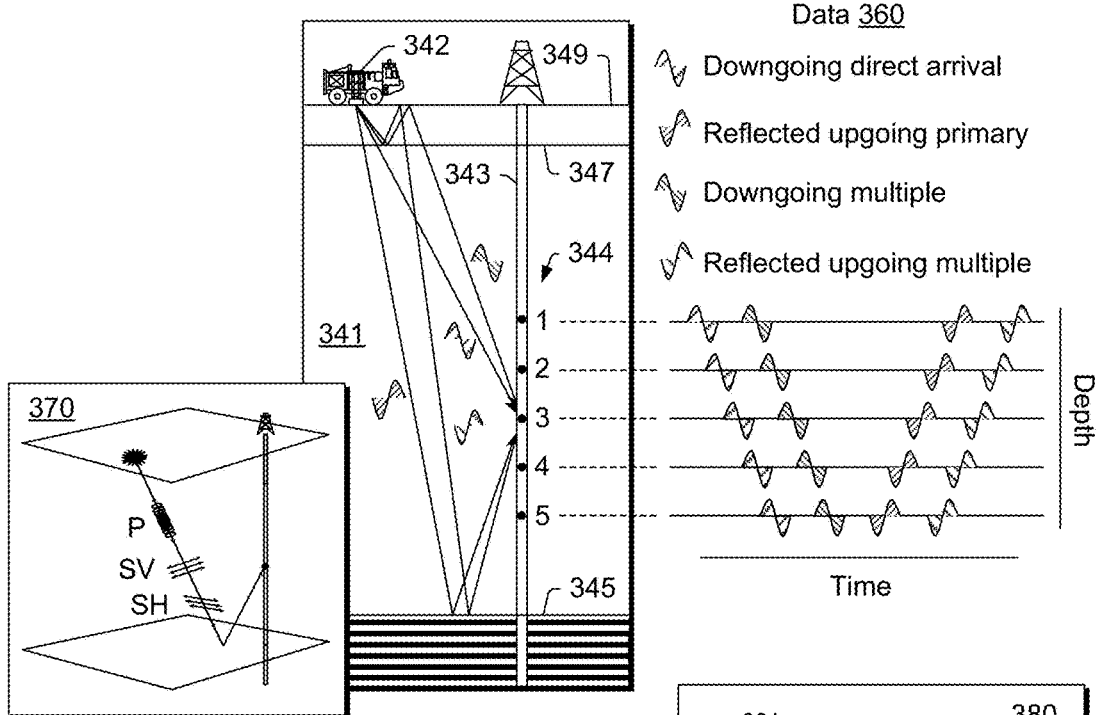
FIG. 3 illustrates examples of techniques that may acquire data.
Figure 3:
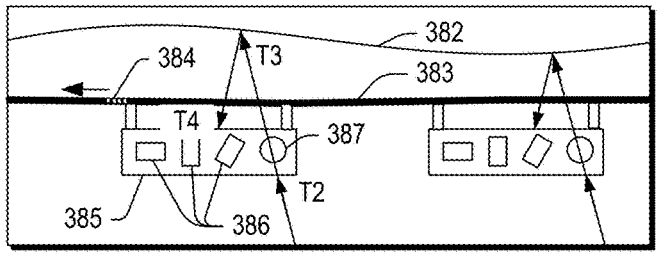
Figure 3:
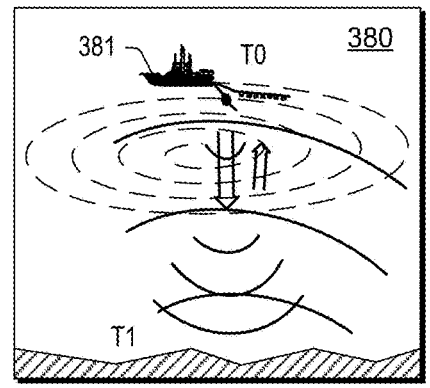
Figure 3:
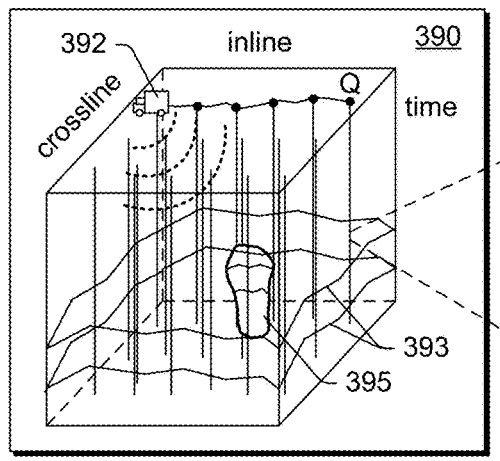
Figure 3:
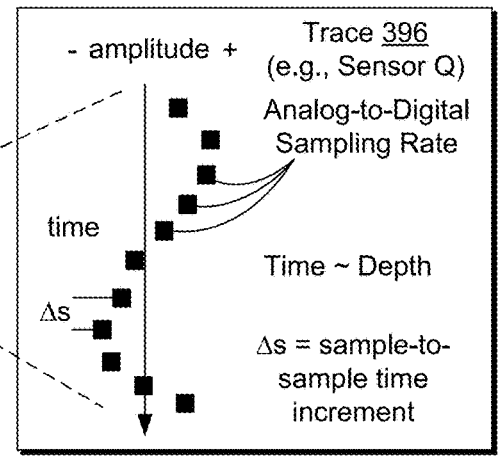

FIG. 3 shows an example of an acquisition technique 340 to acquire seismic data (see, e.g., data 360). As an example, a system may process data acquired by the technique 340, for example, to allow for direct or indirect management of sensing, drilling, injecting, extracting, etc., with respect to a geologic environment. In turn, further information about the geologic environment may become available as feedback (e.g., optionally as input to the system). As an example, an operation may pertain to a reservoir that exists in a geologic environment such as, for example, a reservoir. As an example, a technique may provide information (e.g., as an output) that may specifies one or more location coordinates of a feature in a geologic environment, one or more characteristics of a feature in a geologic environment, etc.

In FIG. 3, the technique 340 may be implemented with respect to a geologic environment 341. As shown, an energy source (e.g., a transmitter) 342 may emit energy where the energy travels as waves that interact with the geologic environment 341. As an example, the geologic environment 341 may include a bore 343 where one or more sensors (e.g., receivers) 344 may be positioned in the bore 343. As an example, energy emitted by the energy source 342 may interact with a layer (e.g., a structure, an interface, etc.) 345 in the geologic environment 341 such that a portion of the energy is reflected, which may then be sensed by one or more of the sensors 344. Such energy may be reflected as an upgoing primary wave (e.g., or "primary" or "singly" reflected wave). As an example, a portion of emitted energy may be reflected by more than one structure in the geologic environment and referred to as a multiple reflected wave (e.g., or "multiple"). For example, the geologic environment 341 is shown as including a layer 347 that resides below a surface layer 349. Given such an environment and arrangement of the source 342 and the one or more sensors 344, energy may be sensed as being associated with particular types of waves.

As an example, a "multiple" may refer to multiply reflected seismic energy or, for example, an event in seismic data that has incurred more than one reflection in its travel path. As an example, depending on a time delay from a primary event with which a multiple may be associated, a multiple may be characterized as a short-path or a peg-leg, for example, which may imply that a multiple may interfere with a primary reflection, or long-path, for example, where a multiple may appear as a separate event. As an example, seismic data may include evidence of an interbed multiple from bed interfaces, evidence of a multiple from a water interface (e.g., an interface of a base of water and rock or sediment beneath it) or evidence of a multiple from an air-water interface, etc.

As shown in FIG. 3, the acquired data 360 can include data associated with downgoing direct arrival waves, reflected upgoing primary waves, downgoing multiple reflected waves and reflected upgoing multiple reflected waves. The acquired data 360 is also shown along a time axis and a depth axis. As indicated, in a manner dependent at least in part on characteristics of media in the geologic environment 341, waves travel at velocities over distances such that relationships may exist between time and space. Thus, time information, as associated with sensed energy, may allow for understanding spatial relations of layers, interfaces, structures, etc. in a geologic environment.

FIG. 3 also shows a diagram 370 that illustrates various types of waves as including P, SV an SH waves. As an example, a P-wave may be an elastic body wave or sound wave in which particles oscillate in the direction the wave propagates. As an example, P-waves incident on an interface (e.g., at other than normal incidence, etc.) may produce reflected and transmitted S-waves (e.g., "converted" waves). As an example, an S-wave or shear wave may be an elastic body wave, for example, in which particles oscillate perpendicular to the direction in which the wave propagates. S-waves may be generated by a seismic energy sources (e.g., other than an air gun). As an example, S-waves may be converted to P-waves. S-waves tend to travel more slowly than P-waves and do not travel through fluids that do not support shear. In general, recording of S-waves involves use of one or more receivers operatively coupled to earth (e.g., capable of receiving shear forces with respect to time). As an example, interpretation of S-waves may allow for determination of rock properties such as fracture density and orientation, Poisson's ratio and rock type, for example, by crossplotting P-wave and S-wave velocities, and/or by other techniques.

FIG. 3 also shows an example of a technique 380 where equipment 381 such as a ship may tow an energy source and a string of sensors 383 at a depth below the sea surface 382. In such an example, the energy source may emit energy at a time T0, a portion of that energy may be reflected from the seabed at a time T1 and a portion of that reflected energy may be received at the string of sensors 383 at a time T2. As an example, the equipment 381 may include one or more components such as one or more of the components of the system 250 of FIG. 2.

As mentioned with respect to the technique 340, a wave may be a primary or a wave may be a multiple. As shown in an enlarged view for the technique 380, the sea surface 382 may act to reflect waves such that sensors 385 of the string of sensors 383 may sense multiples as well as primaries. In particular, the sensors 385 may sense so-called sea surface multiples, which may be multiples from primaries or multiples of multiples (e.g., due to sub-seabed reflections, etc.).

As an example, each of the sensors 385 may sense energy of an upgoing wave at a time T2 where the upgoing wave reflects off the sea surface 382 at a time T3 and where the sensors may sense energy of a downgoing multiple reflected wave at a time T4 (see also the data 360). In such an example, sensing of the downgoing multiple reflected wave may be considered to be a form of noise that interferes with sensing of one or more upgoing waves. As an example, an approach that includes summing data acquired by a geophone and data acquired by a hydrophone may help to diminish noise associated with downgoing multiple reflected waves. Such an approach may be employed, for example, where sensors may be located proximate to a surface such as the sea surface 382 (e.g., arrival times T2 and T4 may be relatively close). As an example, the sea surface 382 or a water surface may be an interface between two media. For example, consider an air and water interface. As an example, due to differing media properties, sound waves may travel at about 1,500 m/s in water and at about 340 m/s in air. As an example, at an air and water interface, energy may be transmitted and reflected (e.g., consider an "impedance" mismatch).

As an example, each of the sensors 385 may include at least one geophone 386 and a hydrophone 387. As an example, a geophone may be a sensor configured for seismic acquisition, whether onshore and/or offshore, that can detect velocity produced by seismic waves and that can, for example, transform motion into electrical impulses. As an example, a geophone may be configured to detect motion in a single direction. As an example, a geophone may be configured to detect motion in a vertical direction. As an example, three mutually orthogonal geophones may be used in combination to collect so-called 3C seismic data. As an example, a hydrophone may be a sensor configured for use in detecting seismic energy in the form of pressure changes under water during marine seismic acquisition. As an example, hydrophones may be positioned along a string or strings to form a streamer or streamers that may be towed by a seismic vessel (e.g., or deployed in a bore). Thus, in the example of FIG. 3, the at least one geophone 386 can provide for motion detection and the hydrophone 387 can provide for pressure detection. As an example, data 384 (e.g., analog and/or digital) may be transmitted via equipment, for example, for processing, etc.

As an example, a method may include analysis of hydrophone response and vertical geophone response, which may help to improve a PZ summation, for example, by reducing receiver ghost and/or free surface-multiple noise contamination (see, e.g., PZSUM algorithm, discussed further below). As an example, a ghost may be defined as a reflection of a wavefield as reflected from a water surface (e.g., water and air interface) that is located above a receiver, a source, etc. (e.g., a receiver ghost, a source ghost, etc.). As an example, a receiver may experience a delay between an upgoing wavefield and its downgoing ghost, which may depend on depth of the receiver.

As an example, a surface marine cable may be or include a buoyant assembly of electrical wires that connect sensors and that can relay seismic data to the recording seismic vessel. As an example, a multi-streamer vessel may tow more than one streamer cable to increase the amount of data acquired in one pass. As an example, a marine seismic vessel may be about 75 m long and travel about 5 knots, for example, while towing arrays of air guns and streamers containing sensors, which may be located, for example, about a few meters below the surface of the water. A so-called tail buoy may assist crew in location an end of a streamer. As an example, an air gun may be activated periodically, such as at about 25 m increments (e.g., about 10 second intervals) where the resulting sound wave travels into the Earth, which may be reflected back by one or more rock layers to sensors on a streamer, which may then be relayed as signals (e.g., data, information, etc.) to equipment on the tow vessel.

As an example, pressure data may be represented as "P" and velocity data may be represented as "Z"; noting, however, that the vertical component of a measured particle velocity vector may be denoted "V" and that "Z" may refer to a scaled, measured particle velocity. For example, in various equations presented herein, "V" represents a measured velocity and "Z" represents a scaling thereof.

As an example, a hydrophone may sense pressure information (e.g., P data) and a geophone may sense velocity information (e.g., V and/or Z data). As an example, a hydrophone may output signals, optionally as digital data, for example, for receipt by a system. As an example, a geophone may output signals, optionally as digital data, for example, for receipt by a system. As an example, the system 250 may receive P and V/Z data via one or more of the one or more network interfaces 260 and process such data, for example, via execution of instructions stored in the memory 258 by the processor 256. As an example, the system 250 may store raw and/or processed data in one or more of the one or more information storage devices 252.

FIG. 3 also shows an example of a scenario 390 where acquisition equipment 392 can emit energy from a source (e.g., a transmitter) and receiving reflected energy via one or more sensors (e.g., receivers) strung along an inline direction. As the region includes layers 393 and, for example, the geobody 395, energy emitted by a transmitter of the acquisition equipment 392 can reflect off the layers 393 and the geobody 395. Evidence of such reflections may be found in the acquired traces. As to the portion of a trace 396, energy received may be discretized by an analog-to-digital converter that operates at a sampling rate. For example, the acquisition equipment 392 may convert energy signals sensed by sensor Q to digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

Figure 4:
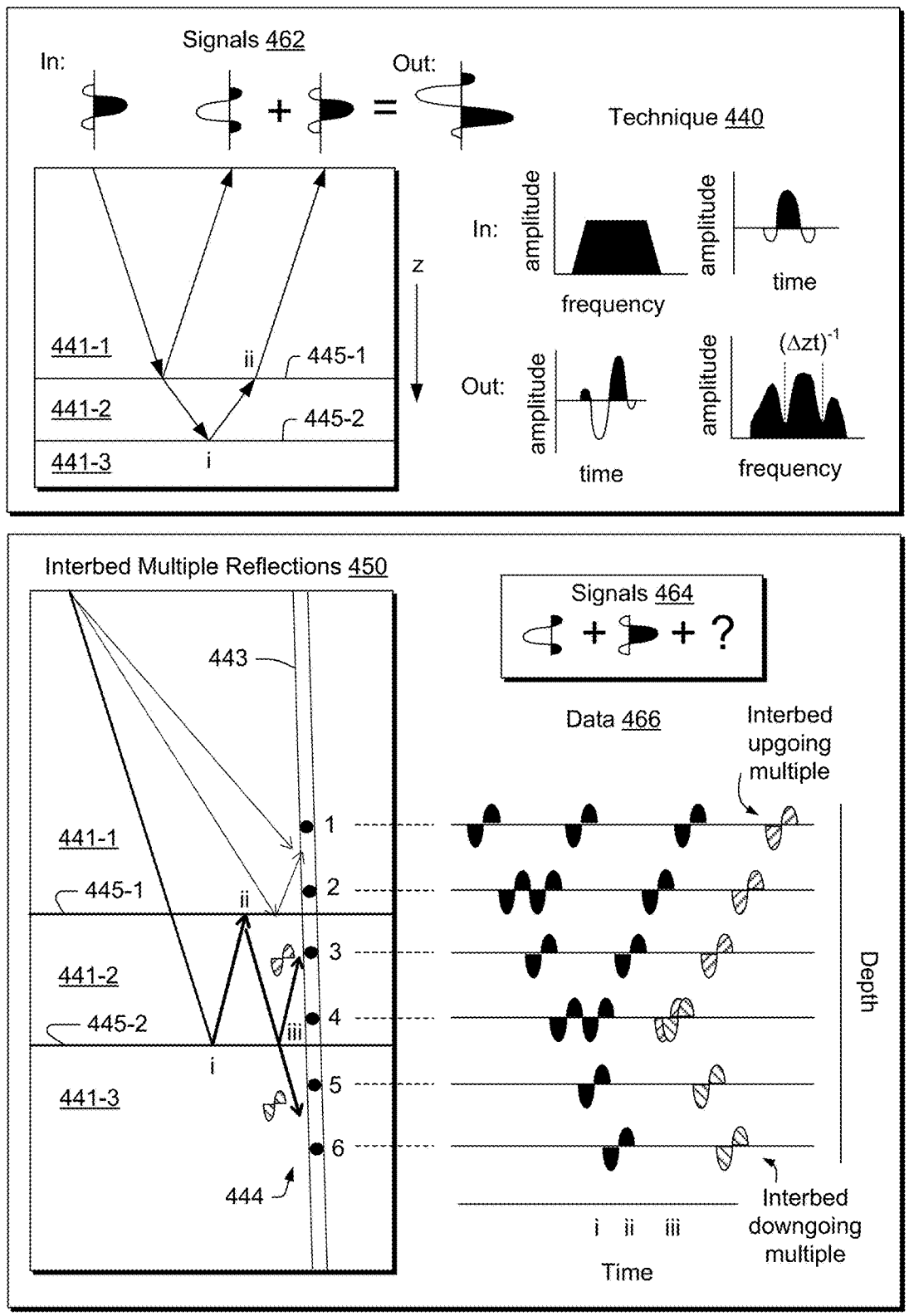
FIG. 4 illustrates examples of signals, an example of a technique, examples of data, etc.

FIG. 4 shows an example of a technique 440, examples of signals 462 associated with the technique 440, examples of interbed multiple reflections 450 and examples of signals 464 and data 466 associated with the interbed multiple reflections 450. As an example, the technique 440 may include emitting energy with respect to time where the energy may be represented in a frequency domain, for example, as a band of frequencies. In such an example, the emitted energy, with respect to time, may be a wavelet and, for example, referred to as a source wavelet which has a corresponding frequency spectrum (e.g., per a Fourier transform of the wavelet from a time domain to a frequency domain).

As an example, a geologic environment may include layers 441-1, 441-2 and 441-3 (e.g., rock layers, etc.) where an interface 445-1 exists between the layers 441-1 and 441-2 and where an interface 445-2 exists between the layers 441-2 and 441-3. As illustrated in FIG. 4, a wavelet may be first transmitted downward in the layer 441-1; be, in part, reflected upward by the interface 445-1 and transmitted upward in the layer 441-1; be, in part, transmitted through the interface 445-1 and transmitted downward in the layer 441-2; be, in part, reflected upward by the interface 445-2 (see, e.g., "i") and transmitted upward in the layer 441-2; and be, in part, transmitted through the interface 445-1 (see, e.g., "ii") and again transmitted in the layer 441-1. In such an example, signals (see, e.g., the signals 462) may be received as a result of wavelet reflection from the interface 445-1 and as a result of wavelet reflection from the interface 445-2. These signals may be shifted in time and in polarity such that addition of these signals results in a waveform that may be analyzed to derive some information as to one or more characteristics of the layer 441-2 (e.g., and/or one or more of the interfaces 445-1 and 445-2). For example, a Fourier transform of signals may provide information in a frequency domain that can be used to estimate a temporal thickness (e.g., $\Delta zt$) of the layer 441-2 (e.g., as related to acoustic impedance, reflectivity, etc.).

As to the data 466, as an example, they illustrate further transmissions of emitted energy, including transmissions associated with the interbed multiple reflections 450. For example, while the technique 440 is illustrated with respect to interface related events i and ii, the data 466 further account for additional interface related events, denoted iii, that stem from the event ii. Specifically, as shown in FIG. 4, energy is reflected downward by the interface 445-1 where a portion of that energy is transmitted through the interface 445-2 as an interbed downgoing multiple and where another portion of that energy is reflected upward by the interface 445-2 as an interbed upgoing multiple. These portions of energy may be received by one or more receivers 444 (e.g., disposed in a well 443) as signals. These signals may be summed with other signals, for example, as explained with respect to the technique 440. For example, such interbed multiple signals may be received by one or more receivers over a period of time in a manner that acts to "sum" their amplitudes with amplitudes of other signals (see, e.g., illustration of signals 462 where interbed multiple signals are represented by a question mark "?"). In such an example, the additional interbed signals may interfere with an analysis that aims to determine one or more characteristics of the layer 441-2 (e.g., and/or one or more of the interfaces 445-1 and 445-2). For example, interbed multiple signals may interfere with identification of a layer, an interface, interfaces, etc. (e.g., consider an analysis that determines temporal thickness of a layer, etc.).

As mentioned, a source wavelet may correspond to a frequency spectrum and a receiver wavelet may have a shape that represents various frequencies. A wavelet may be defined by various characteristics such as, for example, frequency, phase, amplitude and side lobes. As an example, side lobe artifacts may impact interpretation and inversion of seismic data. Side lobe artifacts may be a result of a lack of low frequency content, which can narrow spectral bandwidth. Thus, an acquisition technique that uses a wide amplitude spectrum (e.g., a broad bandwidth) may help to improve resolution of a seismic image, attribute computations, interpretation, etc.

Figure 5:
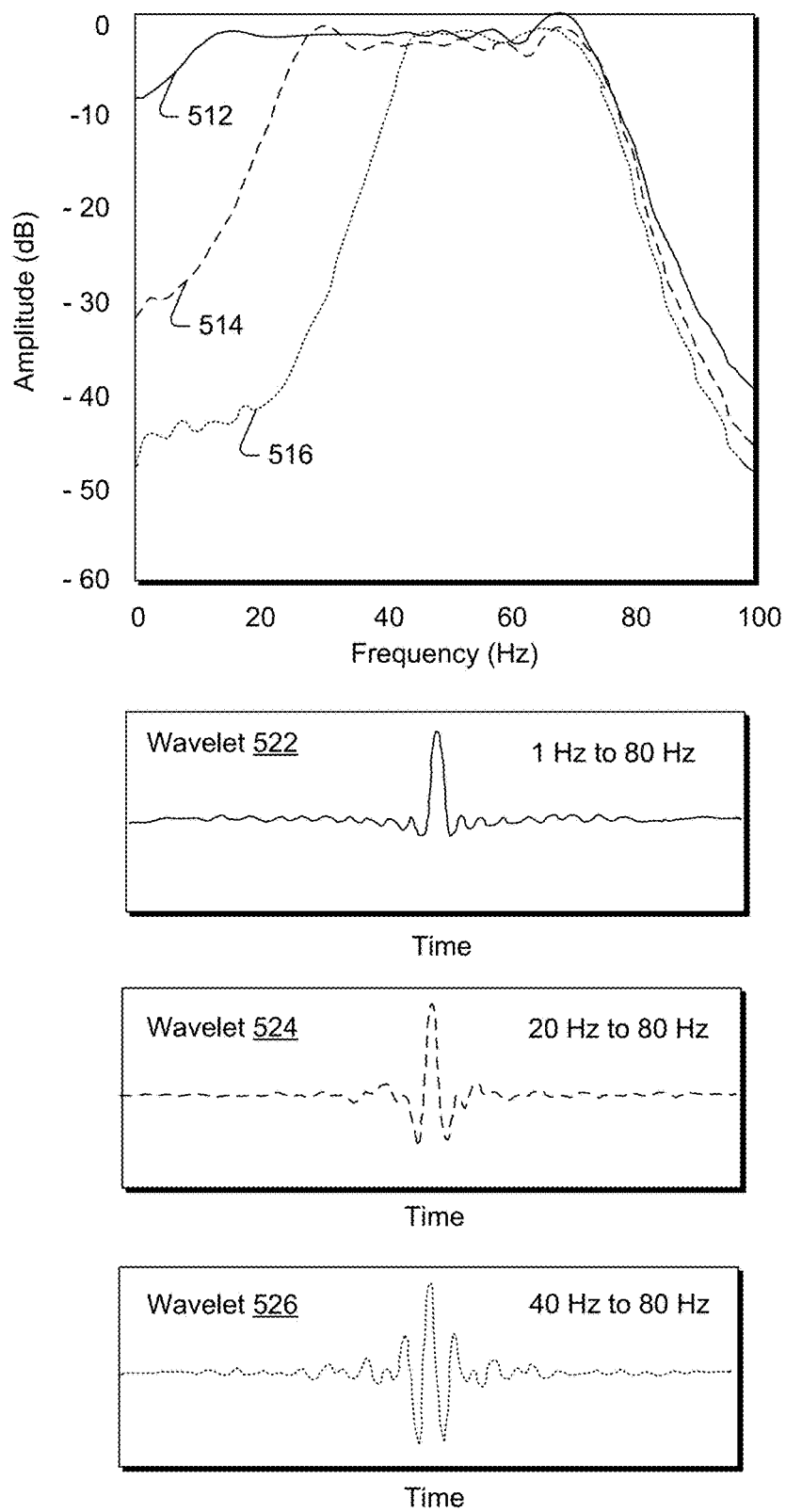
FIG. 5 illustrates examples of frequency spectra and examples of wavelets.

FIG. 5 shows examples of frequency spectra 512, 514 and 516 and examples of corresponding wavelets 522, 524 and 526. As shown in FIG. 5, as lower frequency content is lost, illustrated via plotting amplitude versus frequency, a wavelet (e.g., Klauder wavelet) becomes less distinct, illustrated via plotting amplitude versus time, in that side lobes become more prominent in comparison to a peak (e.g., side lobe amplitude increases as low-frequency content is increasingly lost).

Thus, an acquisition technique may aim to record a relatively broad range of frequencies because loss of high frequencies, low frequencies or high and low frequencies may affect seismic image construction, calculation of various attributes, interpretation, etc. Through recording a range that includes both low and high frequencies, a technique may increase resolution of shallow and deeper parts of a seismic section. As illustrated in FIG. 5, broader bandwidths can imply sharper wavelets with minimal side lobes. An acquisition technique may employ broader bandwidths, for example, to produce higher resolution images of shallower features and to provide for deeper penetration to image deep targets.

As an example, an acquisition technique that implements a flat streamer configuration can present challenges in recording a broadband spectrum. While low-frequency content may be improved via towing such a streamer deeper, deeper streaming can cause high frequencies (e.g., and sometimes the middle frequencies) to be limited by a receiver ghost notch (see, e.g., the technique 380 of FIG. 3). The frequency of a ghost notch for a streamer depends on receiver depth below a water/air interface as the ghost notch is caused by interference between the upgoing, directly-reflected energy and the downgoing, ghost energy, reflected back to the streamer from the water/air interface. As an example, an acquisition technique can include varying the receiver depth along the streamer to create receiver ghost notch diversity, which may extend a low-frequency end of a frequency spectrum.

As an example, a frequency range of an acquisition technique may span octaves (e.g., consider a six octave bandwidth). As an example, an at sea acquisition technique may employ variable-depth streaming to increase low-frequency content. A combination of multi-octave bandwidth and variable-depth streamer acquisition may facilitate generation of sharper and cleaner wavelets with minimal side lobes.

Figure 6:
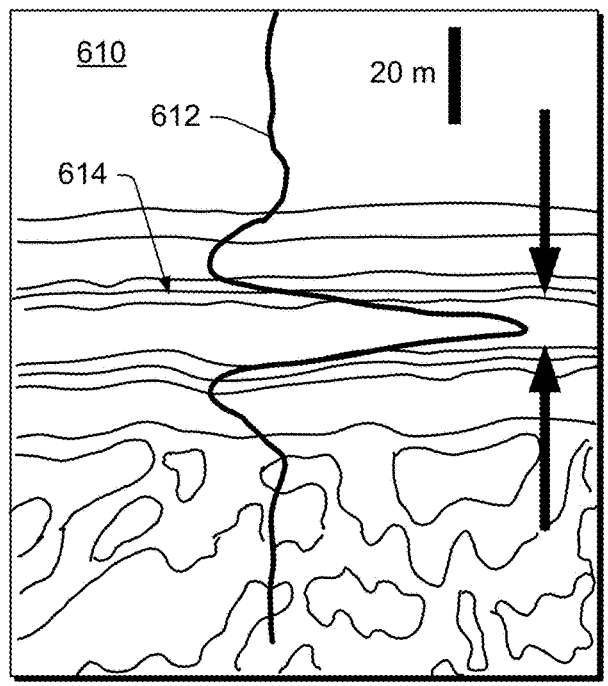
FIG. 6 illustrates examples of seismic data images and wavelets.
Figure 6:
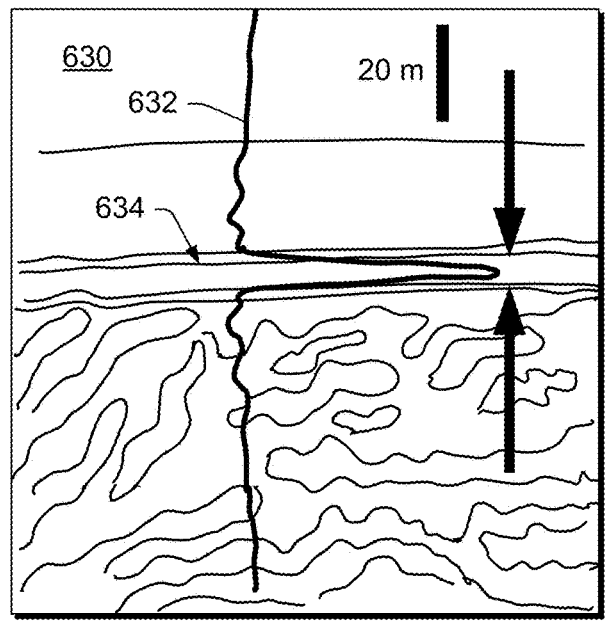

FIG. 6 shows approximate seismic images 610 and 630 with overlaid wavelets 612 and 632 aligned with a reflector 614 and 634. In the seismic images 610 and 630, while the reflector 614 and 634 is, physically, the same reflector, the "narrower" wavelet 632 provides for a more accurate representation of that reflector. In the seismic image 610, the wavelet 612 includes side lobes that cause amplitude (e.g., energy) to be both above and below a baseline of the wavelet 612. Thus, a thickness of the reflector 614 in the seismic image 610 is shown by image pixels with values that represent positive amplitudes of energy that rises to a peak in a time domain while being bordered by thick bands of image pixels with values that represent negative amplitudes. In comparison, the reflector 634 in the seismic image 630 lacks the bordering thick bands (e.g., due to wavelet side lobes) and is shown by image pixels with values that represent positive amplitudes of a narrower span of energy that rises to a peak in a time domain. Again, one way to help assure a narrower wavelet is to use an acquisition technique that can maintain a broad band of frequencies where, for example, presence of low frequencies may help to keep side lobe artifacts to a minimum.

Figure 7:
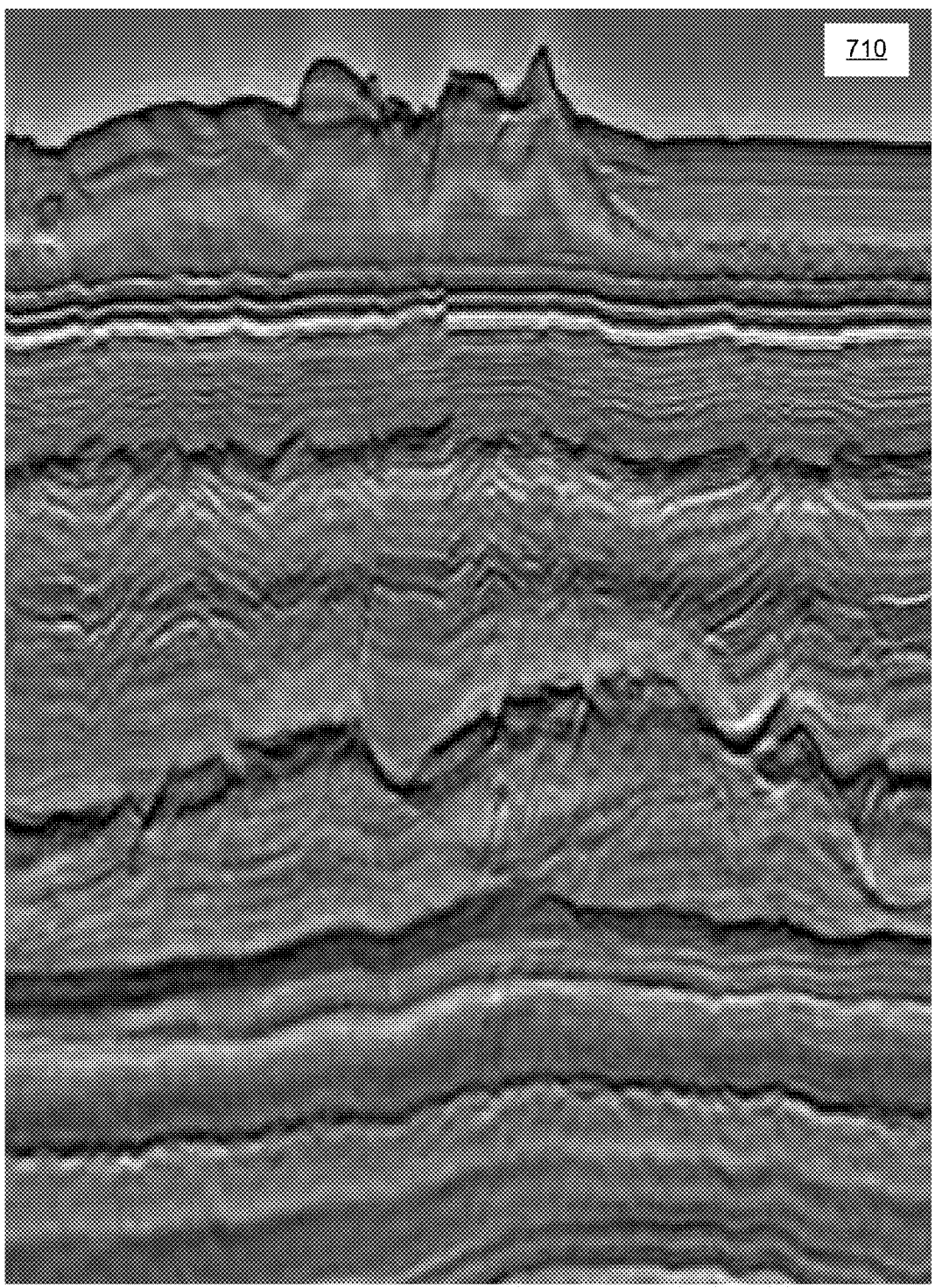
FIG. 7 illustrates an example of a seismic data image that includes coherent lineament noise.

FIG. 7 shows an example of a seismic image 710 as acquired using an acquisition technique that aims to maintain a broad band of frequencies. For example, such a technique may be implemented at sea using streamers with varying depth below a water/air interface to help maintain low frequency content. While the seismic image 710 may be a considerably high resolution, a particular form of noise is present. Such noise appears as "lines", many of which are disposed at angles to various layers, interfaces, etc. Accordingly, the "linear" form of noise in the seismic image 710 lacks characteristics of random noise. In other words, the noise in the seismic image 710 includes coherent noise.

Seismic images such as the seismic image 710 of FIG. 7 may be a result of advances in computing power, telemetry, sensor technology, etc. For example, consider acquisition technology that allows for high channel count and broad frequency ranges. Such technology may be employed with denser receiver deployment and, hence, better recording of a multidimensional wavefield during a seismic survey (see, e.g., acquisition techniques 340 and 380 of FIG. 3).

As illustrated in the seismic image 710 of FIG. 7, such technology may also more "accurately" record a seismic noise wavefield, which may have previously become aliased due to poor spatial sampling. The more "accurate" noise (e.g., as in the seismic image 710) differs in various aspects to noise that had been aliased and appeared relatively random. As explained, such noise may be, at some level, deemed coherent. Such noise may be, for example, deemed a form of "not aliased" noised.

As an example, coherent noise may be harder to attenuate than random noise where the coherent noise cannot be readily distinguished from "genuine" seismic reflections. In the example seismic image 710 of FIG. 7, the coherent noise has a particular form, which may be characterized as steeply dipping linear features (e.g., present on stacked and/or migrated seismic images).

As to various processing techniques, a stack can refer to, for example, a processed seismic record that includes traces that have been added together from different records. Such a technique may aim to reduce noise and improve data quality. As an example, another processing technique is migration. Migration can include moving reflections in seismic data in an attempt to represent such reflections at their "correct" locations in an x-y-time space of seismic data (e.g., including two-way travel-time, position relative to shot-points, etc.). Migration can improve seismic interpretation and mapping as the locations of geological structures (e.g., faults, etc.) may be more accurate in migrated seismic data. Migration can collapse diffractions, for example, from secondary sources such as reflector terminations against faults and may correct, for example, bow ties to form synclines. As to particular migration techniques, these can include dip moveout (DMO), frequency domain, ray-trace and wave-equation migration.

As to random noise, it may be considered disturbances in seismic data that are not coherent (e.g., lacking a phase relationship between adjacent traces, unlike air waves and ground roll) and that cannot be correlated to a seismic energy source. Random noise may be reduced from data using one or more techniques such as, for example, stacking traces, filtering during processing, using arrays of geophones during acquisition, etc.

As an example, a form of coherent noise may be associated with ground roll. As an example, a form of coherent noise may be associated with multiples. As an example, a form of coherent noise may be consistent in phase from trace to trace. As an example, a form of coherent noise may be a "linear" form such as, for example, the form of noise in the seismic image 710 of FIG. 7.

In the seismic image 710 of FIG. 7, multiple instances of near-vertical coherent lines exists, which do not reasonably appear to be related to faulting, or other geological features common in nature. In particular these "lineaments" tend to appear near the surface, for example, due to poor fold and steep ray-paths. Such linear features particularly appear in the water column as being coherent.

As an example, a lineament may be a relatively long linear or gently curving feature on the surface of a terrestrial planet (e.g., or moon) that may be suggestive of an underlying geologic structure or contact. Such lineaments may be identified through remote sensing, such as satellite imagery or topographic, gravimetric and magnetic data.

In the seismic image 710 of FIG. 7, the coherent noise may be referred to as coherent lineament noise in that the coherent noise appears as an artifact that tends to be relatively linear (e.g., where a dimension of a relatively linear portion spans a majority of an artifact's dimension). For example, in the seismic image 710 of FIG. 7, individual instances of such coherent noise include a relatively linear portion. As an example, an individual instance may be defined by one or more parameters such as, for example, an angle, a width, a length, a slope, a similarity (e.g., to another instance or instances), etc. As an example, an angle may be defined with respect to a horizon as a reference, a layer as a reference, an interface as a reference, and/or a vertical reference. As an example, a width may be defined in a plane, for example, with respect to a number of pixels (e.g., or voxels). As an example, a length may be defined as an overall length, a vertical length, etc. As an example, a similarity parameter may characterize an instance with respect to one or more other instances of coherent lineament noise. For example, consider a slope similarity parameter, a length similarity parameter, an angle similarity parameter, a width similarity parameter, etc.

As an example, a method can include attenuating a form of noise that exhibits at least some amount of coherency. For example, a method can include selectively attenuate coherent noise such as the "linear" noise of the seismic image 710 of FIG. 7. In such an example, the method can attenuate at least a portion of such noise while aiming to preserve an underlying "primary" image that may include features such as, for example, dipping features like faults, fractures and channels. As an example, a method may employ "surgical" dip filtering. As an example, a method may employ filtering to a selected region or regions (e.g., of seismic data, an image, etc.).

Figure 8:
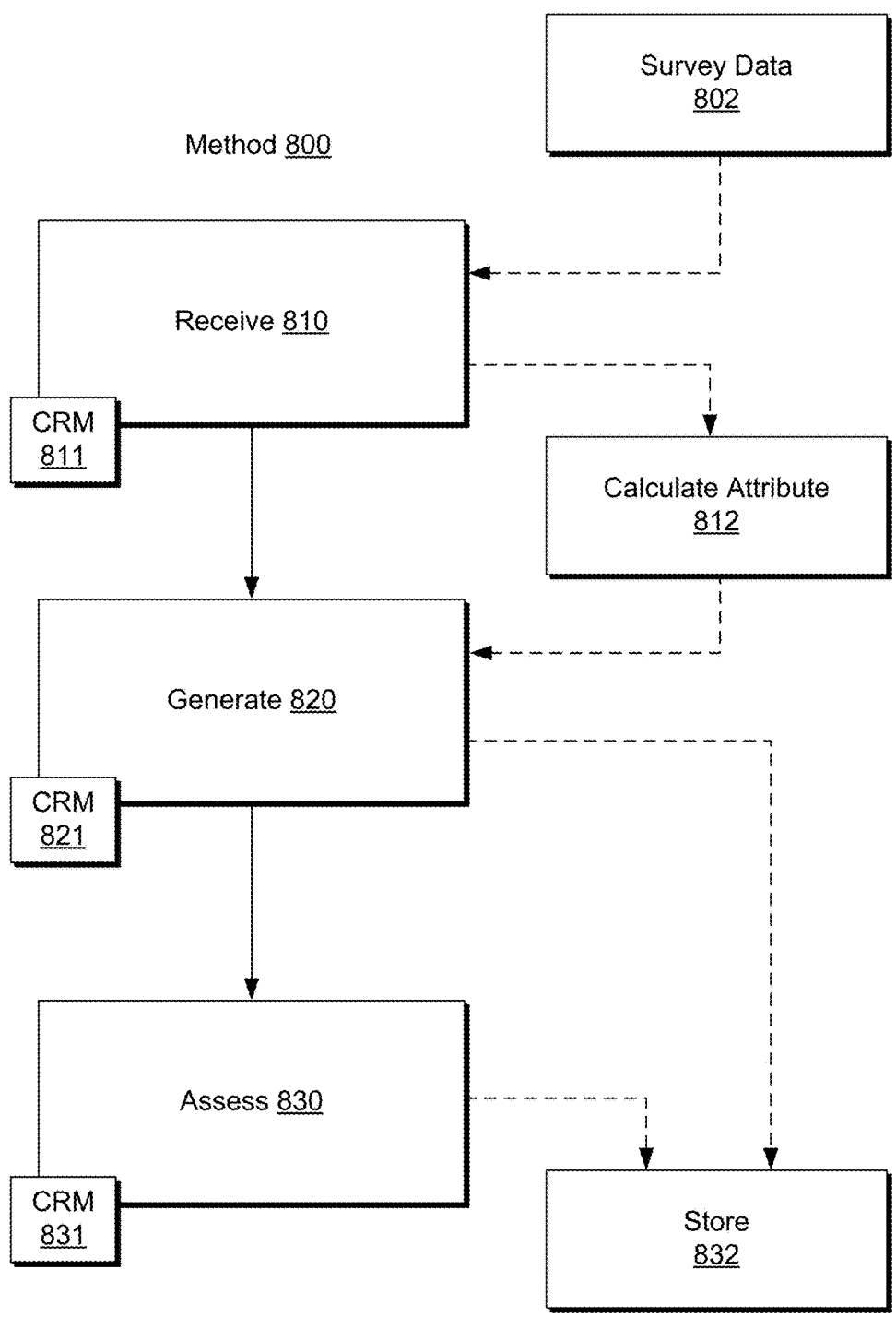
FIG. 8 illustrates an example of a method.

FIG. 8 shows an example of a method 800 that includes a reception block 810 for receiving data that includes signal data and coherent noise data where the signal data includes signal data that corresponds to a multidimensional physical structure; generating filtered data by filtering at least a portion of the data to attenuate at least a portion of the coherent noise data by applying a multidimensional geometric coherent noise model defined by at least one geometric parameter; and assessing a portion of the signal data in the generated filtered data to characterize the multidimensional physical structure. In such a method, assessing may include rendering the filtered data to a display and interacting with a computing system to characterize a multidimensional physical structure. As an example, interacting may be via an input mechanism (e.g., a touchscreen, a mouse, a trackball, a stylus, etc.). As an example, interacting may include calling for execution of one or more algorithms that may, for example, highlight at least a portion of a multidimensional physical structure (e.g., as represented by rendering of measurement data, etc. to a display).

As an example, a method can include a reception block for receiving survey data, a generation block for generating filtered data by filtering at least a portion of the survey data to reduce coherent lineament noise, and an assessment block for assessing at least a portion of the filtered survey data. In such an example, the survey data may be or include seismic data of a geologic survey. As an example, such data may be processed data (e.g., stacked, migrated, etc.). As an example, data may be data of seismic data sets. In such an example, an individual set may correspond to one of a plurality of individual emitter-detector arrangements of a geologic survey. As an example, survey data may be or include data of an ultrasound survey (e.g., of a body, of a product, of a structure, etc.).

As an example, a survey may include Illuminating a region, an object, etc., from multiple angles where a data set is acquired for each of the multiple angles. In such an example, illumination may be via one or more types of energy such as, for example, sound, photons, x-rays, etc.

In the example of FIG. 8, the reception block 810 may include receiving survey data per a data block 802 (e.g., consider amplitude variation with offset (AVO) or amplitude versus angle (AVA) survey data and/or one or more other types of survey data). In the example of FIG. 8, the method 800 may include calculating an attribute based at least in part on received data. For example, a calculation block 812 can include calculating an attribute such as, for example, a structural attribute. In such an example, the generation block 820 may include filtering an attribute (e.g., an attribute slice, an attribute cube, etc.) where the attribute includes, for example, coherent lineament noise. In the example of FIG. 8, the assessment block 830 may include assessing quality of at least a portion of data as filtered per the generation block 820. As shown in the example of FIG. 8, a storage block 832 may store data, which may be filtered data (e.g., data that has had at least a portion of coherent lineament noise removed), coherent lineament data (e.g., data that corresponds to coherent lineament noise) and/or other data related to the method 800.

The method 800 is shown in FIG. 8 in association with various computer-readable media (CRM) blocks 811, 821 and 831. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 800. As an example, a computer-readable medium (CRM) may be a computer-readable storage medium that is non-transitory and that is not a carrier wave. As an example, one or more of the block 811, 821 and 831 may be in the form of a module such as, for example, one of the modules 270 of the system 250 of FIG. 2.

Figure 9:
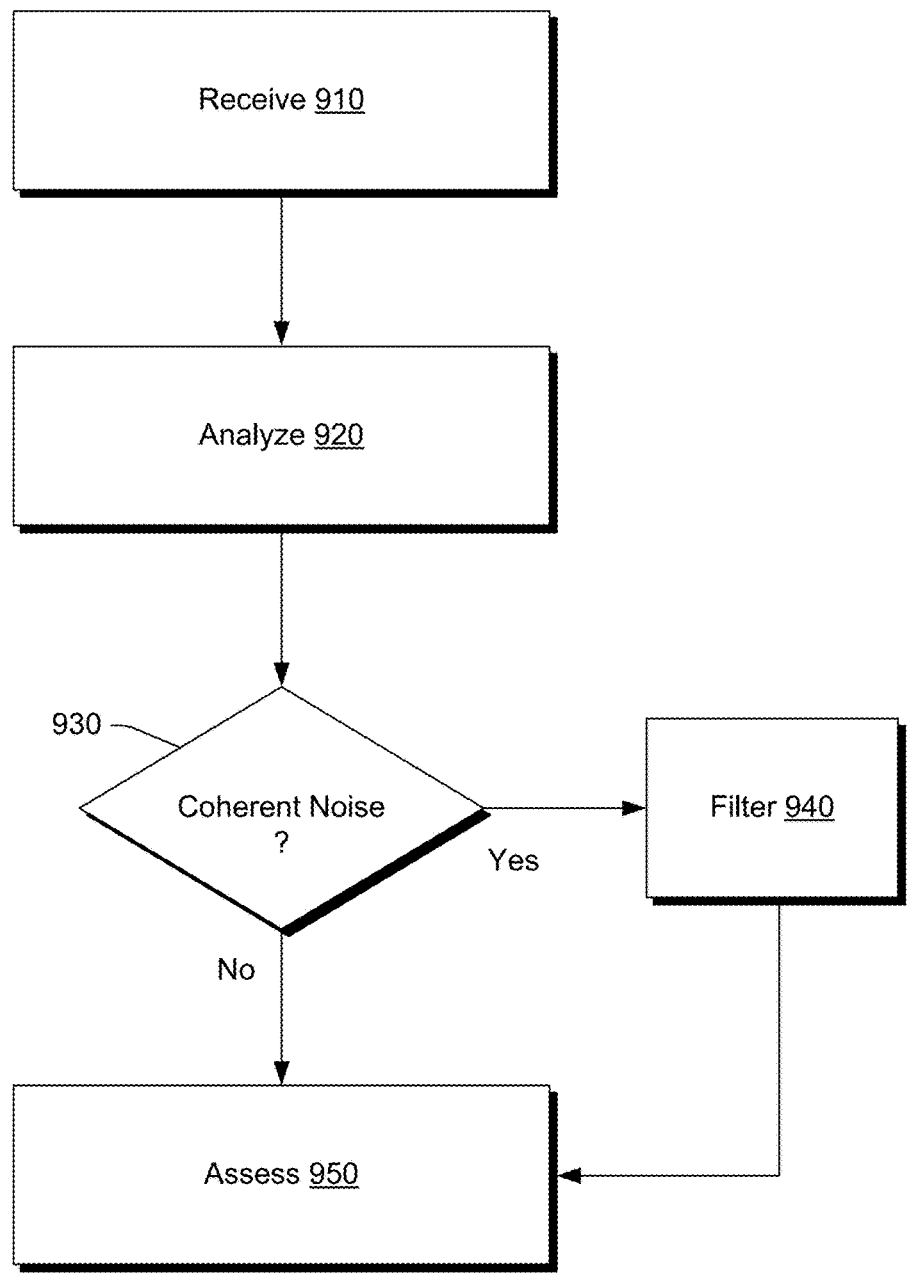
FIG. 9 illustrates an example of a method.

FIG. 9 shows an example of a method 900 that includes a reception block 910 for receiving data, an analysis block 920 for analyzing at least a portion of the received data, a decision block 930 for deciding whether coherent noise exists in at least a portion of the received data based at least in part on one or more analyses of the analysis block, a filter block 940 for filtering at least a portion of the received data to generate filtered data (e.g., or a generation block for generating filtered data) and an assessment block 950 for assessing at least a portion of the filtered data (e.g., via interpretation, attribute calculation, other processing, etc.).

In the example of FIG. 9, the analysis block 920 may include applying one or more feature detection algorithms. In such an example, a line detection algorithm may output information as to linear features that may exist in the data. As an example, an edge detection algorithm may aim to identify points in digital data at which values for a plurality of points change (e.g., evidence a discontinuity, etc.). In such an example, a line detection algorithm may be employed as to such identified points (e.g., to "connect" the points as lines).

As an example, a Hough transform may be applied by the analysis block 920, for example, to detect linear feature in at least a portion of the data set. In such an example, pre-processing may be employed before and/or during application of a Hough transform.

As an example, a Hough transform may be applied as a linear transform that can detect straight lines. In such an example, within a multidimensional data space (e.g., an image space, etc.), a straight line can be described as $y=mx+b$ where the parameter m is the slope of the line, and b is the intercept (y-intercept) (e.g., a slope-intercept model of a straight line). For a Hough transform, characteristics of a straight line may be cast in terms of parameters according to a slope-intercept model. For example, consider a slope parameter m and an intercept parameter b. As another example, consider a parameter r and a parameter $\theta$ (theta) that in conjunction define a polar coordinate. In a so-called "Hough space", a set of points that form a straight line produce sinusoids that cross at the parameters for that line.

As an example, a result of a linear Hough transform detection algorithm can be a two-dimensional array (e.g., a matrix) where one dimension is a quantized angle $\theta$ and the other dimension is a quantized distance r. In such an example, individual elements of the matrix can have a value equal to a number of points (e.g., or pixels, etc.) that are positioned on a line represented by quantized parameters (r, $\theta$). In such an example, the element with the highest value indicates the straight line that is most represented in the input data.

As an example, a method may include implementing a kernel-based detection algorithm. For example, a method may include implementing a kernel-based Hough transform algorithm. As an example, an algorithm may be employed at or proximate to one or more features in data such as, for example, an interface, a layer, etc. For example, a method may include detecting a layer (e.g., a horizon, an event, etc.) and applying a kernel-based detection algorithm in a region proximate to (e.g., adjacent to) the layer. As an example, a kernel-based detection algorithm may traverse a feature (e.g., progress along a layer). As an example, a system may include circuitry (e.g., hardware or hardware and software) that can process information in parallel. In such an example, a detection algorithm may be applied in a parallel. For example, consider a kernel-based detection algorithm where multiple kernels can be applied in parallel (e.g., at various points proximate to a layer).

As an example, an analysis may output a number of lines and an average line angle for detected coherent lineament noise. As an example, an average line angle may be provided along with a standard deviation or other metric. As an example, a line length may be output by an analysis. As an example, one or more parameters output by an analysis may be implemented to make a decision as to whether to apply filtering and/or may be implemented to construct a filter, tune a filter, apply a filter, etc. As an example, one or more parameters output by an analysis may be implemented to decide how many times a filter is to be applied and, for example, as to whether one or more filter parameters are to be adjusted, for example, on a region-by-region application basis, a time-by-time of application basis, etc.

As an example, coherent noise may be present in data where instances of such noise may include a finite vertical extent and may include a relatively linear portion that can be characterized by an angle (e.g., or slope) that may be, for example, steeply dipping (e.g., a dip angle greater than a dip angle threshold). In such an example, a method may include surgically detecting such dipping lineaments and separating them from a primary signal, for example, via a subtraction process. For example, consider a method that includes performing a wavefield separation of constant dipping, short vertical extent, coherent noise, which may be referred to as coherent lineament noise.

Figure 10:
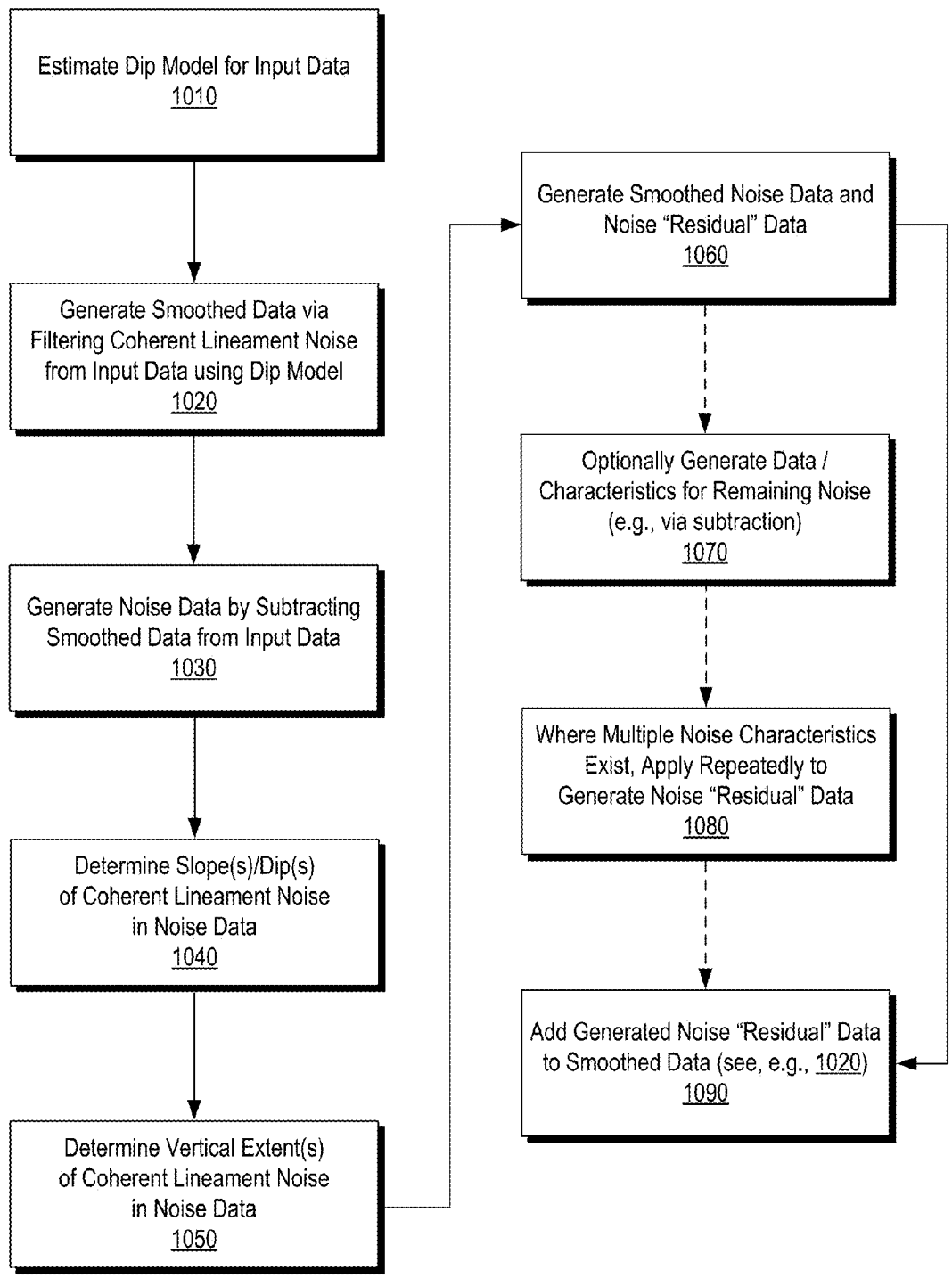
FIG. 10 illustrates an example of a method.

FIG. 10 shows an example of a method 1000 that includes an estimation block 1010 for estimating a dip model for input data, a generation block 1020 for generating smoothed data via filtering coherent lineament noise from at least a portion of the input data using the dip model, a generation block 1030 for generating noise data by subtracting the smoothed data from at least a portion of the input data, a determination block 1040 for determining one or more slopes (e.g., one or more dips, etc.) of coherent lineament noise in at least a portion of the noise data, a determination block 1050 for determining one or more vertical extents of coherent lineament noise in at least a portion of the noise data, a generation block 1060 for generating smoothed noise data and noise "residual" data, and an addition block 1090 for adding generated noise "residual" data to at least a portion of the smoothed data (see, e.g., the smoothed data of the generation block 1020).

As indicated in FIG. 10, the method 1010 can optionally include a generation block 1070 for generating data and/or characteristics for remaining noise, for example, via subtraction and a generation block 1080 for repeatedly generating noise "residual" data, for example, where multiple noise characteristics exist. For example, consider coherent lineament noise characterized by a first slope (e.g., angle or dip) and coherent lineament noise characterized by a second slope (e.g., angle or dip). In such an example, first noise "residual" data may be generated by reduction of the coherent lineament noise characterized by the first slope and second noise "residual" data may be generated by reduction of coherent lineament noise characterized by the second slope to the extent that such noise exists in the first noise "residual" data. Such a process may be performed in a loop where a final residual corresponds to information that was removed by the dip model (e.g., of the estimation block 1010) that can now be returned to the input data. Thus, a method may include removing "too much" information and then returning at least a portion of the removed information (e.g., in the form of a residual generated by applying one or more coherent lineament noise filters).

As an example, a method can include estimating a smooth (e.g., long wavelength) dip model of a seismic image (e.g., which may be 2D image or a 3D image, pre-stack or post-stack, etc.) (see, e.g., the estimation block 1010). In such an example, the dip model can be specified to be sufficiently smooth such that impact of dipping noise representable by the model is minimal as to leaving an imprint on a dip field.

As an example, a method can include layer-parallel smoothing of seismic data, for example, using an estimated dip model and a large lateral operator (see, e.g., the generation block 1020). In such an example, the operator may be specified to be sufficiently large in an effort to filter dipping noise of interest.

As an example, a method can include subtracting a smoothed image from an input seismic (see, e.g., the generation block 1030). In such an example, the difference image can include the dipping noise and, for example, some high-frequency "genuine" signal. In such an approach, the majority of the primary energy (e.g., desired to be preserved) will be absent in the difference image (e.g., or volume). Such a difference image (e.g., or volume) may be used as an "input noise model", which may be subject to subsequent filtering.

As an example, optionally via an automated approach (e.g., via dip scanning), a method can include establishing a predominant slope (e.g., angle, dip, etc.) of coherent noise to be attenuated (see, e.g., the determination block 1040). In such an example, the predominant slope may be dip in an inline direction, a cross-line direction, or in a specified azimuth direction. As an example, dip may be constant or, for example, varying spatially and/or vertically (e.g., varying gradually according to one or more parameters, etc.).

As an example, a method can include, optionally via an automated approach, establishing a length (e.g., a vertical extent) of coherent noise to be attenuated (see, e.g., the determination block 1050). In such an example, a vertical extent may be longer than A thickness of a dipping seismic signal that is to be retained (e.g., as part of a final result).

As an example, a method can include layer-parallel smoothing (e.g., filtering) of a noise model (see, e.g., the generation block 1060). For example, such a method can include using an established dip established (see, e.g., the determination block 1040) and an established operator length (see, e.g., the determination block 1050). In such an example, a result can be that the coherent noise with the chosen dip is predominantly preserved while other information (e.g., signal and remaining noise) is attenuated.

As an example, a method can optionally include subtracting coherent noise, as detected (e.g., and/or isolated) (see, e.g., the generation block 1060), from an input noise model and, for example, letting the result be an updated residual "input noise model". Such a method may include successive filtering, for example, at different slopes (e.g., angles, dips, etc.). As an example, a method may include performing a component analysis on noise, for example, consider a principle component analysis (PCA) that can determine a predominant slope (e.g., or angle, dip, etc.). A method may include determining a maximum response, for example, for establishing a first slope (e.g., angle, dip, etc.). As an example, a method can include scanning and analyzing power, energy, etc. of predominant coherent noise based at least in part on the scanning.

As an example, a method may include one or more loops. For example, consider a method that includes a loop that includes the blocks 1040, 1050, 1060 and 1070 of the method 1000 of FIG. 10. In such an example, a loop may be repeated until one or more criteria are met, for example, that allow for filtering away coherent steeply dipping energy (e.g., coherent lineament noise).

As an example, a method can include adding a residual "input noise model" to a smoothed image (see, e.g., the smoothed data of the generation block 1020; see, e.g., the addition block 1090). As an example, the result may be assessed, stored, further processed, etc. As an example, the result may be considered to be a filtered result, for example, per a generation block such as the generation block 820 of the method 800 of FIG. 8, the filter block 940 of the method 900 of FIG. 9, etc.). As an example, a result may be a filtered attribute, a filtered seismic, a filtered slice, a filtered volume, etc.

As an example, a noise model may model noise that includes shapes that may be nonlinear. For example, coherent noise artifacts may include hyperbolic, parabolic or circular noise shapes. As an example, coherent noise may be present as vibration noise. As an example, noise may include a bow shape, a cone shape, etc. As an example, coherent noise may exhibit a diffraction pattern where a pattern model may be implemented to model such noise. As an example, a noise model may include a first portion that models a first characteristic of coherent noise and a second portion that models a second characteristic of coherent noise. In such an example, the first and second portions may account for "interactions" that may exhibit diffraction patterns (e.g., with nodes and anti-nodes). As an example, a first portion may be for downgoing noise and a second portion may be for upgoing noise (e.g., or vice versa). As an example, a noise model may include a plurality of portions that collectively model coherent noise.

As an example, a noise model may be a geometric noise model. In such an example, the noise model may model instances of coherent noise features in data. As an example, a noise model may be characterized by one or more geometric noise model parameters. For example, consider one or more parameters that can model a line, one or more parameters that can model a curve, etc. As an example, a geometric noise model may be a multidimensional model. In such an example, dimensions may be spatial dimensions or dimensions may include at least one spatial dimension and at least one a time dimension. As an example, a coherent noise feature may be geometrically modeled using a multi-dimensional noise model where dimensions include at least one spatial dimension. In such an example, a time dimension may correspond to a spatial dimension, for example, consider a travel time dimension that may correspond to a depth dimension.

As an example, coherent noise may appear as features that span multiple layers (e.g., rock layers). As an example, coherent noise may appear in a medium other than rock. For example, at a sea floor, coherent noise may appear in water adjacent to a sea floor and water interface.

Figure 11:
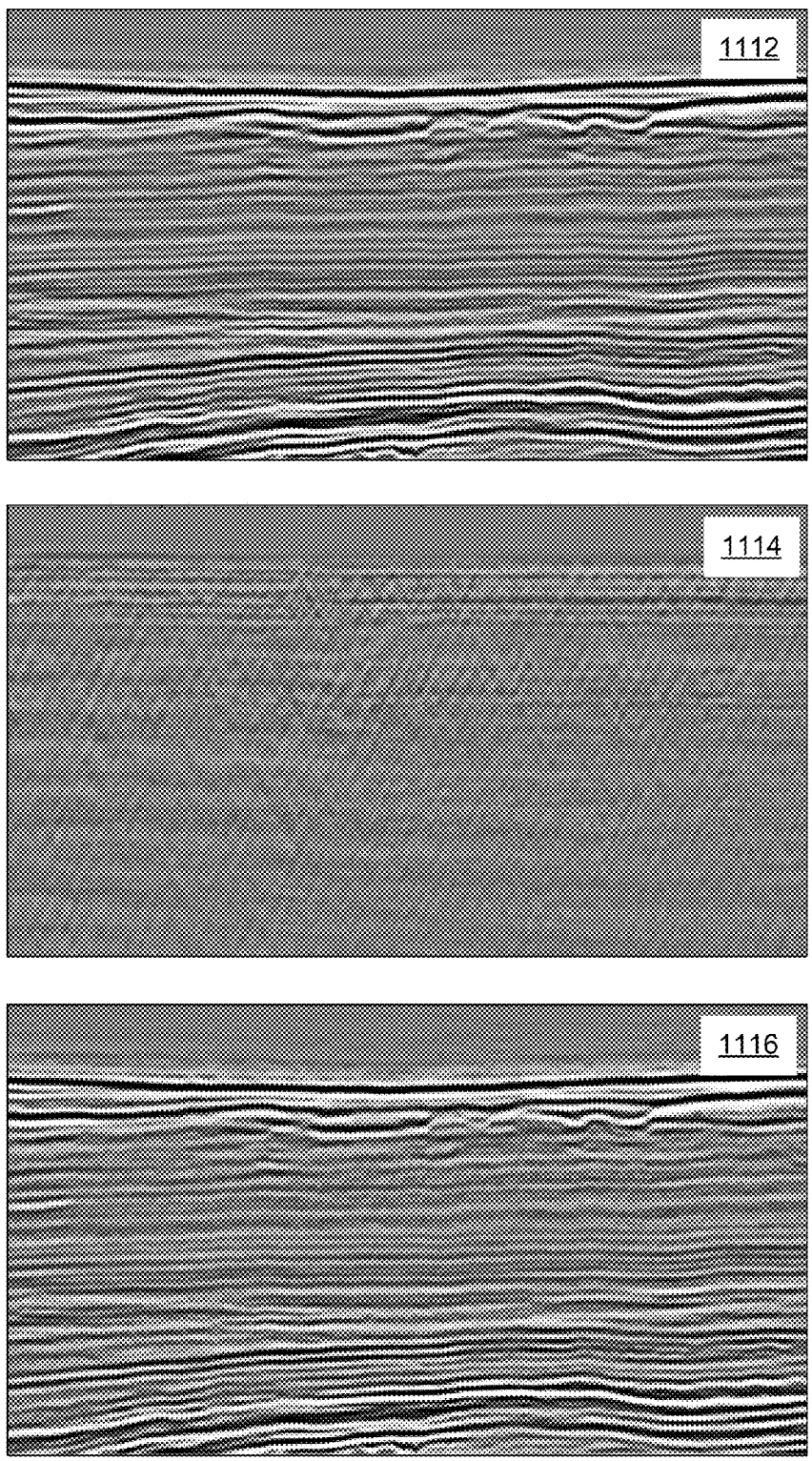
FIG. 11 illustrates examples of seismic data images.

FIGS. 11, 12, 14 and 15 show example data images 1112, 1114, 1116, 1118, 1120, 1122, 1124, 1126, 1128, 1130, 1132 and 1134 where a vertical dimension corresponds to depth (e.g., meters). In FIG. 11, the data image 1112 is of seismic data without synthetic coherent lineament noise; the data image 1114 is of synthetic coherent lineament noise with a slope of approximately 0.70 meter dip per meter (m/m); and the data image 1116 is a summation of the seismic data and the synthetic coherent lineament noise.

Figure 12:
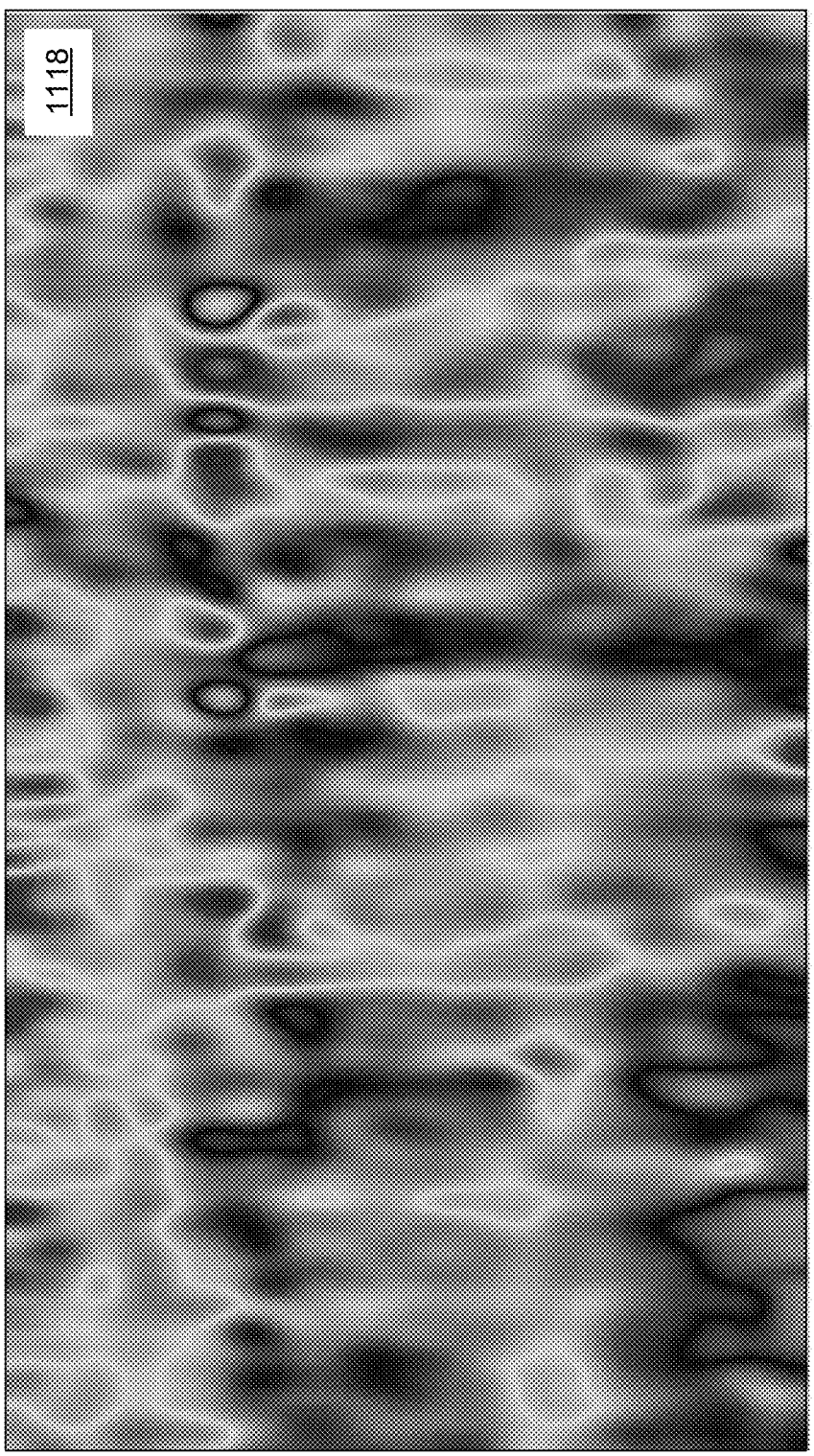
FIG. 12 illustrates examples of seismic data images.

As an example, a method such as the method 1000 of FIG. 10 may be applied to data of the data image 1116. For example, a method can include estimating a smooth (e.g., long wavelength) dip model of the data of the seismic image 1116. In such an example, the dip model may be so smooth to reduce imprint of the dipping noise on the dip field. In FIG. 12, the data image 1118 is estimated structural dip data of the noisy seismic data of the data image 1116 of FIG. 11. As an example, the unit for estimated dip can be meter dip down per meter laterally (meter/meter). For example, positive dip can be defined as dipping down to the right while negative dip can be defined as dipping up to the right.

As an example, a technique for dip estimation may be a volumetric dip technique that offers a full theoretical resolution such as a technique described in U.S. Pat. No. 8,463,551, entitled "Consistent Dip Estimation for Seismic Imaging", issued 11 Jun. 2013, which is incorporated by reference herein. The data image 1118 of FIG. 12 corresponds to such a technique where a lateral radius is set to be approximately 16 traces and a vertical radius is set to be approximately 8 samples.

The approach described in the aforementioned application (Pub. No. US 2011/0118985 A1) can decouple dip through definition of a positive dip and a negative dip. Thus, for example, at a given point in a volume, the positive dip (e.g., to the right) and the negative dip (e.g., to the left) may not necessarily have uniform slope across the given point. Such an approach can alleviate first derivative concerns, especially where a boundary may exist within a subsurface volume (e.g., channel, fault, body, etc.).

As an example, for a volumetric dip model, such as the model described in U.S. Pat. No. 8,463,551, the following information may be provided for points (e.g., p(i,j,k)) in a subsurface volume: (i) positive inline dip; (ii) negative inline dip; (iii) positive crossline dip; (iv) negative crossline dip; and (v) dip uncertainty. With respect to data structure or data storage demands, such an approach can be represented, for example, using five volumes (e.g., of similar size as an input seismic data volume) that represent the subsurface environment (e.g., as imaged by seismic data). As an example, a unit for dip can be defined as millisecond per trace, or meter per trace, another isomorphic unit of choice (e.g. angle), etc. In such an example, a lateral coordinate system may be indexed by inline and crossline numbers; noting that another coordinate system could be used (e.g. based on row/column numbers, geographical position in x/y coordinates, etc.).

Figure 13:
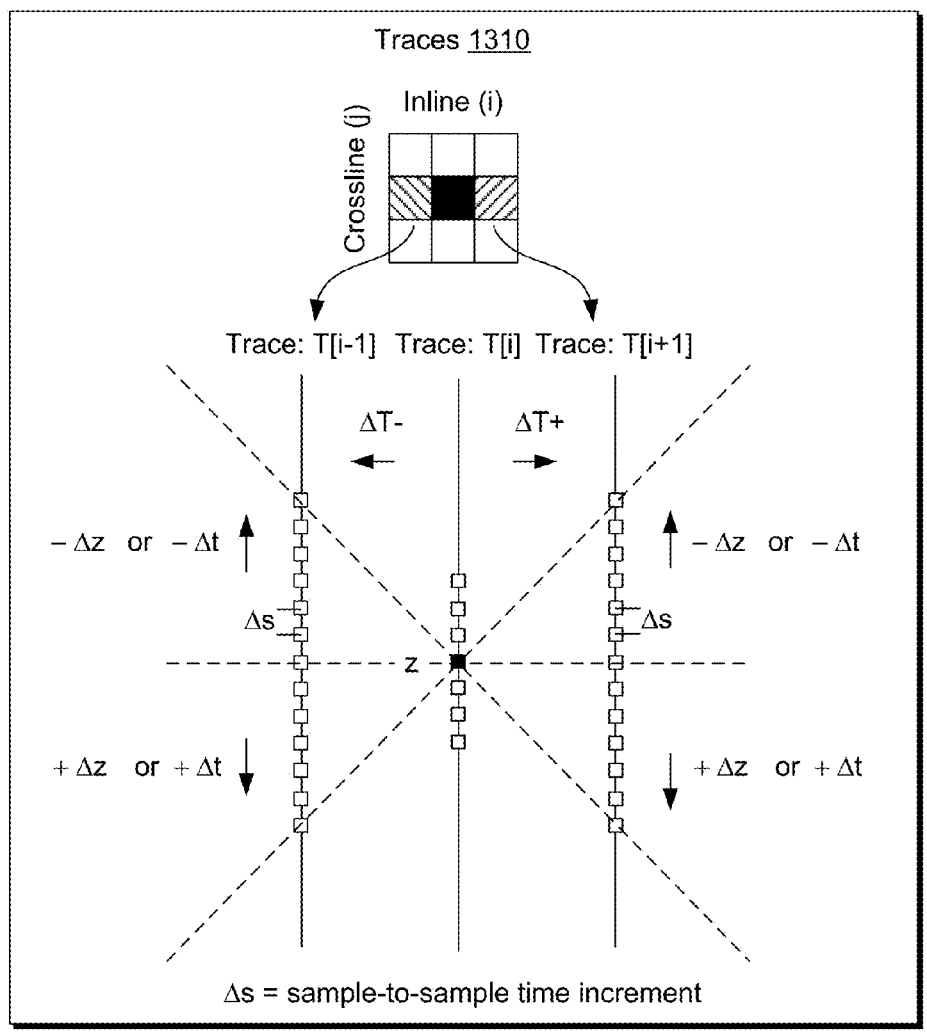
FIG. 13 illustrates an example of a technique.

FIG. 13 shows an example of a technique to determine dip values from seismic data (see also, e.g., U.S. Pat. No. 8,463,551). In particular, FIG. 13 shows a series of traces 1310 and a method 1330 that implements a Taylor series expansion. The series of traces 1310 includes various parameters, for example, for trace position in a 2D inline and crossline coordinate system and for sample location with respect to time or depth. Also shown is a sample-to-sample time increment $\Delta s$, which may be, for example, converted to a sample-to-sample depth increment.

As to the method 1330, a trace T[i] and a trace T[i−1] are considered as being related by equation 1334. By applying a Taylor series expansion, the equation can be represented as equation 1338. By rearranging the equation 1338, the equation 1342 is provided, which can be solved for $\Delta z(z)$, which represents a time or depth displacement for "z" between trace T[i] and trace T[i−1], which may be stored as a negative dip value for the trace T[i] and a location defined by the sample "z". As an example, a feature exists at "z" in the trace T[i] and evidence of that feature exists in the trace T[i−1] at a location displaced by a distance or time from that of the trace T[i], where the displacement is represented by $\Delta z$. As that displacement is with respect to a prior trace with respect to the inline coordinate, for trace T[i], that displacement is a negative dip for the trace T[i]. Equations may be applied for a positive dip for the trace T[i], for example, with respect to the trace T[i+1]. Further, equations may applied for both negative dip and positive dip with respect to the crossline coordinate (e.g., T[j], T[j−1], and T[j+1]). In such a manner, values for four of the five volumes may be determined.

As indicated in the example of FIG. 13, a method may implement a Taylor series expansion technique for calculating time/depth-varying timing difference (e.g., structural dip) between traces in positive and negative directions. As an example, a method may implement a technique other than a Taylor series expansion for calculating time/depth-varying timing difference (e.g., structural dip) between traces. For example, a cross-correlation technique may be implemented, a technique based on a phase shift analysis between traces, etc. As an example, a method may implement a Taylor series expansion technique and another technique for calculating time/depth-varying timing difference (e.g., structural dip) between traces.

Figure 14:
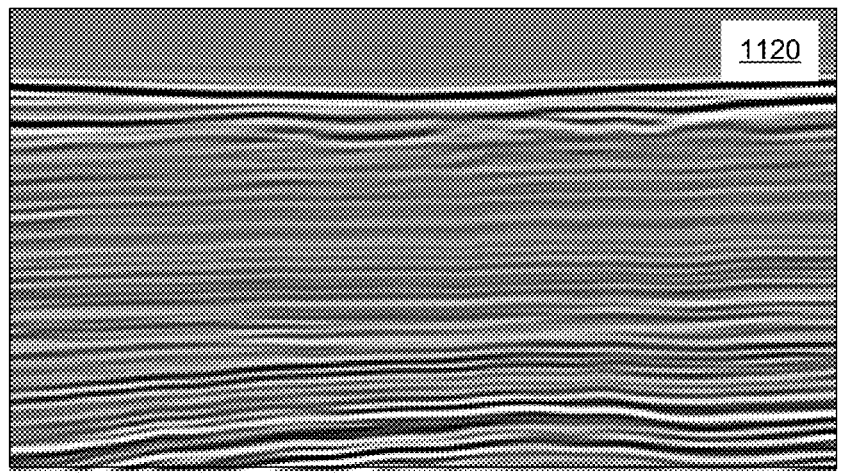
FIG. 14 illustrates examples of seismic data images.
Figure 14:
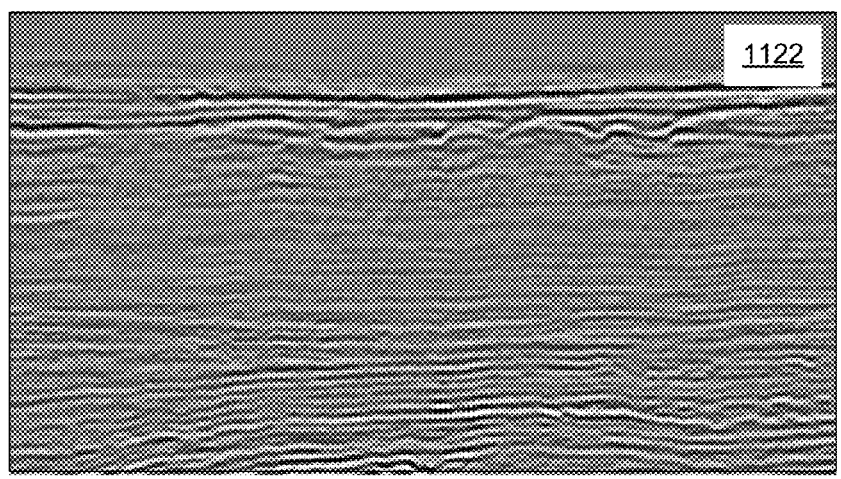
Figure 14:
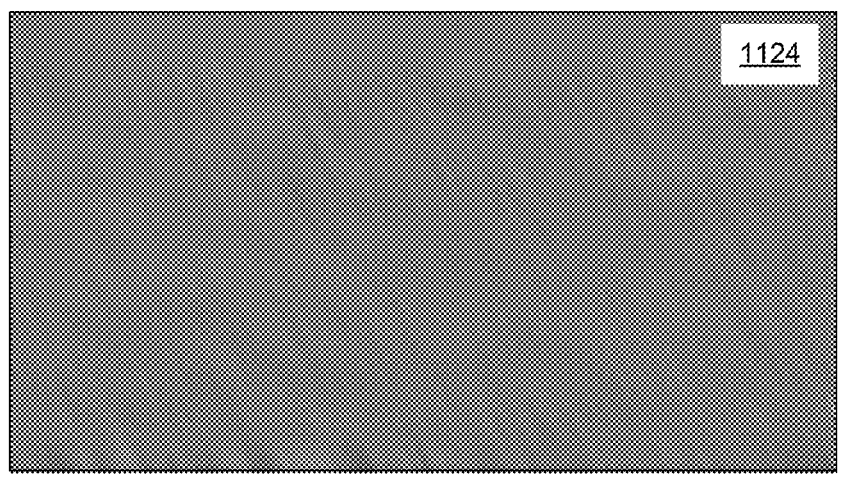

As an example, a method can include layer-parallel smoothing of seismic data using an estimated dip model with a relatively large lateral operator. For example, a lateral operator sufficiently large to filter away dipping noise of interest. In FIG. 14, the data image 1120 includes data generated using a filter with a lateral radius of approximately 16 traces in the inline direction and in the cross-line direction (e.g., each output sample is a mean value of (2816+1)× (2*16+1) neighboring samples along the estimated (long-wavelength) structural dip). In the data image 1120, a structurally-oriented filter result of input seismic data based on a long-wavelength dip model, steeply dipping noise (e.g., coherent lineament noise) is not discernable.

As an example, a method may optionally assume that dip is zero. For example, where layering/structure tends to be flat in seismic data, where seismic data include a level of nose such that dip is not reliably estimated or where an appropriate dip estimation technique is not available, a method may proceed with an assumption that the dip is zero and hence perform filtering along constant-time/depth slices.

As an example, a method can include subtracting a smoothed image (e.g., smoothed data) from an input image (e.g., input data) to generate a difference image. In such an example, the difference image will include the dipping noise as well as, for example, some high-frequency "genuine" signal. However, depending on an appropriate selection of model parameters, a majority of the primary energy (e.g., to be preserved) will be absent in the difference image (e.g., difference data). Such a difference image (e.g., difference data) can be used as an "input noise model" and, for example, subject to subsequent filtering.

As an example, where smoothed seismic data as in the data image 1120 is subtracted from the input seismic data as in the data image 1116, seismic data such as that of the data image 1122 of FIG. 14 can be a result. As shown in FIG. 14, the data image 1122 (e.g., difference data) includes mostly dipping noise (e.g., coherent lineament noise) and also some genuine geological features that may be desired to be preserved as a result of a method (e.g., or workflow, etc.). As an example, a method may include trying to reduce the amount of genuine signal in difference data, for example, through application of a less hard lateral filter (see, e.g., the filter with the lateral operator).

As an example, a method can include establishing one or more slopes, angles, dips, etc. for coherently lineament noise. As an example, a slope (e.g., or angle, dip, etc.) may account for a larger portion of such noise when compared to another slope. As an example, a series of slopes (e.g., or angles, dips, etc.) may be determined (e.g., established) with a ranking as to corresponding portions of noise. In such an example, a method may include commencing with a slope (e.g., or angle, dip, etc.) that corresponds to a largest portion of the noise and then continuing with one or more other slopes (e.g., or angles, dips, etc.). Such a method may continue until a sufficient amount of noise is accounted for (e.g., for purposes of noise attenuation, etc.). As an example, a method may proceed in order of a ranked parameter or parameters that correspond to portions of noise.

As an example, a method can include determining slope (e.g., or angle, dip, etc.) of coherent lineament noise to be attenuated. In such an example, a slope parameter may correspond to dip in an inline direction, a cross-line direction, or in a desired azimuth direction. As an example, a slope parameter (e.g., an angle parameter, a dip parameter, etc.) may be constant or, for example, slowly varying spatially (e.g., vertically, etc.).

In the example data image, the dipping noise exhibits an approximately constant slope of about 0.70 meter/meter (e.g., in positive and negative directions). As an example, trace spacing may be known a priori (e.g., distance between two neighboring traces). For example, trace spacing may be approximately 6.25 meters, which may be used to calculate a slope of visible linear noise features.

As an example, a system may include a tool for determining one or more parameter values associated with noise. For example, a line drawing tool may be available that can be implemented for drawing lines over perceived coherent lineament noise in an image rendered to a display. In such an example, a system may analyze data associated with drawn lines (e.g., length, slope, etc.) to determine whether a sufficient number of samples (e.g., drawn lines) have been entered via a line drawing tool. As an example, a system may include an automated tool for determining one or more parameter values associated with noise. For example, a scanning tool may implement a detection algorithm to detect lines. As mentioned, a Hough transform algorithm may be implemented to characterize coherent lineament noise. In such an example, characterization may include outputting parameter values such as, for example, slope (e.g., or angle, dip, etc.) and linear extent (e.g., vertical extent, etc.).

As an example, a method can include determining the length (e.g., vertical extent) of coherent lineament noise to be attenuated. As an example, vertical extent may be substantially longer than a thickness of a dipping seismic signal that is desired to be retained as a result of a method.

In FIG. 14, the data image 1122 includes individual dipping noise features that can be characterized as including a vertical length of at least about 100 meters (e.g., a vertical radius of at least about 50 meters). In such an example, the vertical length (e.g., vertical extent) is longer than the thickness of the layers to be preserved and, for example, a vertical filter radius of at least about 50 meters*(0.70*6.25 meter)$^{-1}$ (e.g., about 11 traces) may be sufficient to filter the dipping noise and preserve underlying signal.

As an example, a method can include performing layer-parallel smoothing (e.g., filtering) of an input noise model using established dip (e.g., or dips) and using an appropriate operator length. A result of such smoothing can be that the coherent lineament noise with a chosen dip will be predominantly preserved while other information (e.g., both signal and remaining noise) will be attenuated.

As an example, using an operator radius of 15 traces, which may be greater than a recommended minimum number of traces (see, e.g., the approximately 11 traces of the aforementioned calculation), a result may be generated such as that of the data image 1124 of FIG. 14. As shown in FIG. 14, in the data image 1124, signal features are dipping down to the right where such features exhibit a relatively common slope. Also, the data image 1124 (e.g., as a wavefield) exhibits little genuine signal (e.g., except for a relatively low-frequency part, which may optionally be removed through the application of a low-cut filter, etc.). As shown in FIG. 14, the data image 1124 includes data that correspond to an extracted "downgoing" wavefield with a slope of approximately 0.70 meter per meter.

Figure 15:
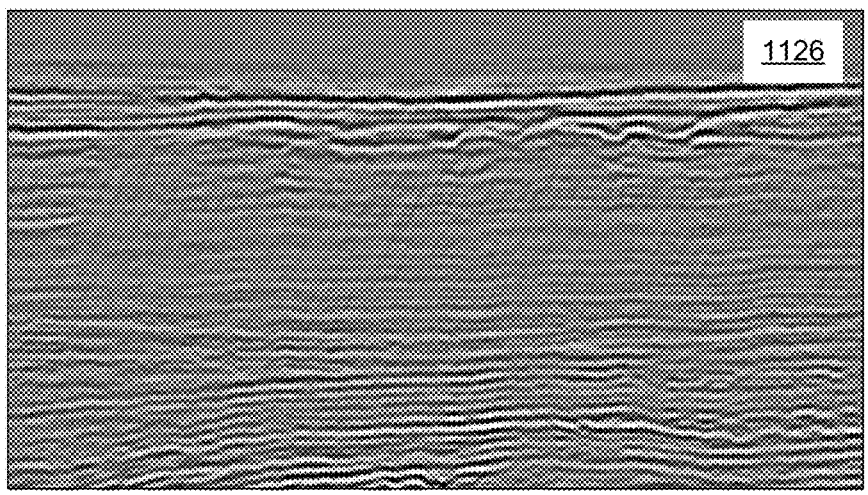
FIG. 15 illustrates examples of seismic data images.
Figure 15:
Figure 15:
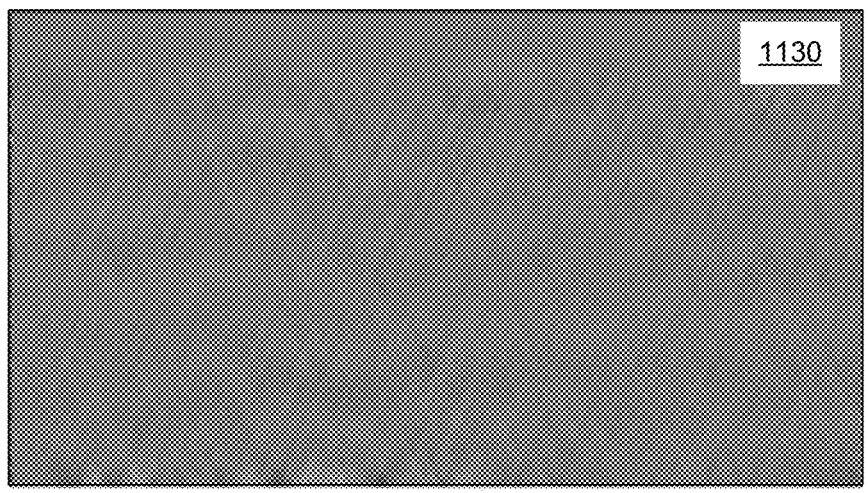

As an example, a method may include subtracting coherent lineament noise (e.g., as detected or isolated) from an input noise model where a result can be an updated residual input noise model. For example, in FIG. 15, the data image 1126 includes data that may be considered residual data as an updated residual input noise model. In FIG. 15, the data image 1126 includes a relatively low level of downgoing noise as prior processing has accounted for a substantial portion of such noise; noting that upgoing noise persists (e.g., in a direction rising vertically with a slope from left to right).

As an example, a method can include repeating various processes to successively filter away coherent lineament noise (e.g., which appears as steeply dipping energy).

As mentioned, in the data image 1126 of FIG. 15, the noise model includes "upgoing" noise with a slope of approximately 0.70 meter per meter. In this example, the vertical extent is about the same as for the downgoing noise. In such an example, a method can include repeating filtering with a negative slope (e.g., changing the sign of a value of a slope parameter) and with an updated noise model. In FIG. 15, the data image 1128 shows a result of such a method, for example, as an extracted upgoing wavefield.

As an example, a method can include summing together downgoing and upgoing wavefields, for example, to generate cumulative data. Such data may be rendered as an image to a display where, for example, an interpretation of the wavefields may be performed. In FIG. 15, the data image 1130 includes extracted downgoing information and extracted upgoing information, which may be, for example, compared to the data image 1114 of FIG. 11. Such data may be compared (e.g., visually, via an algorithm, etc.). As an example, a difference between such data may be used as a metric to determine whether additional filtering is to be performed.

As an example, a method may include an iteration for filtering downgoing or upgoing coherent lineament noise and an iteration for filtering upgoing or downgoing coherent lineament noise. As an example, a method may include a cycle defined by two iterations where one of the two iterations is for filtering coherent lineament noise characterized as being in an upgoing direction or in a downgoing direction and where the other of the two iterations is for filtering coherent lineament noise characterized in an opposite direction (e.g., if upgoing first, then downgoing or if downgoing first, then upgoing).

As an example, a method can include subtracting a downgoing wavefield representing coherent lineament noise from data and subtracting an upgoing wavefield representing coherent lineament noise from data to generate a result (e.g., processed data). For example, in FIG. 16, the data image 1132 includes data resulting from subtraction of an upgoing wavefield from a residual noise model that was generated by subtraction of a downgoing wavefield from data. A visual inspection of the data image 1132 shows little evidence of remaining linear noise. As an example, a visual inspection, an algorithm-based analysis, etc. may be performed on such a result to decide whether one or more additional iterations may be performed to further reduce linear noise (e.g., coherent lineament noise). As an example, a method may include cycles where a cycle performs two iterations, one for upgoing coherent lineament noise and one for downgoing coherent lineament noise.

As an example, a method can include adding a result such as residual input noise model data (e.g., after an upgoing iteration and a downgoing iteration) to smoothed data (e.g., a smoothed image such as the data image 1112 of FIG. 11) to generate a filtered result (e.g., a filtered seismic image, filtered seismic data, etc.).

Figure 16:
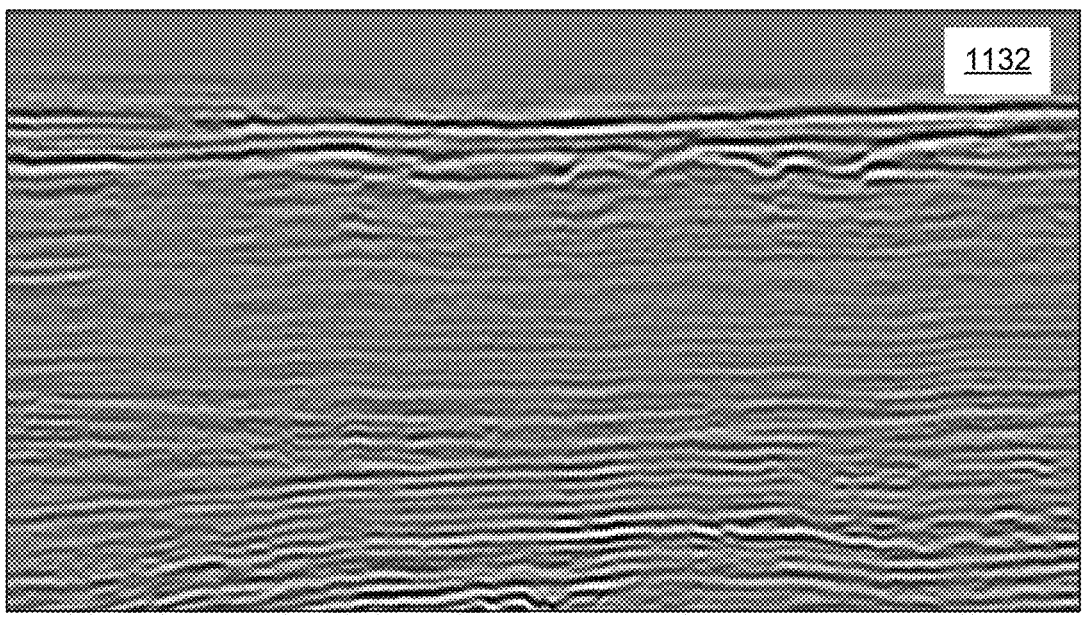
FIG. 16 illustrates examples of seismic data images.
Figure 16:
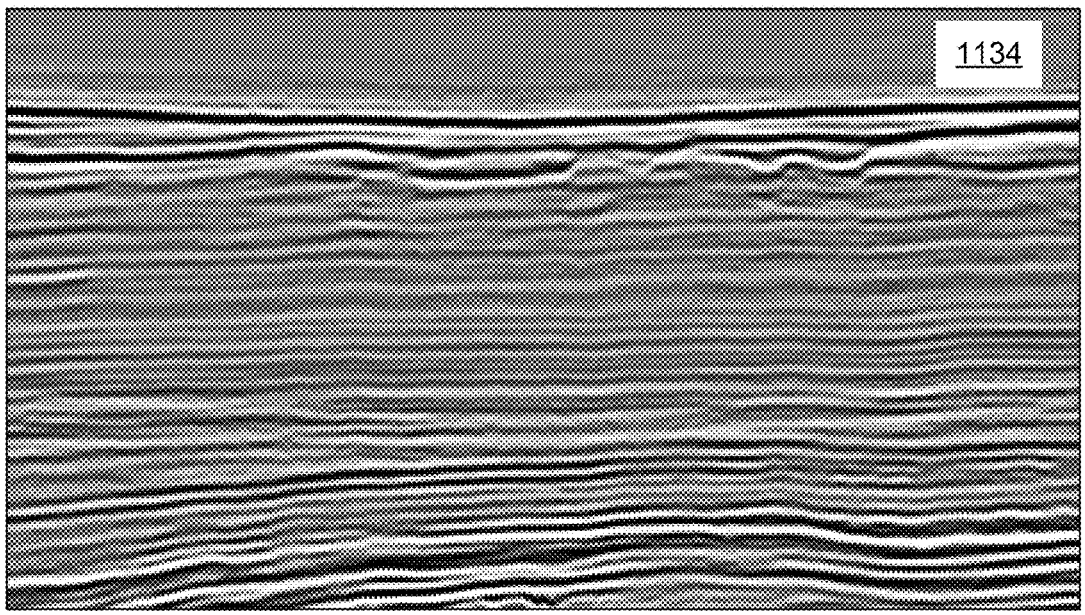

In FIG. 16, the data image 1134 corresponds to a filtered result (e.g., filtered data). For example, the data image 1134 is a sum of data of the data image 1120 of FIG. 14 and the data of the data image 1132 of FIG. 16. The data image 1134 of FIG. 16 may be compared to the data image 1116 of FIG. 11, which may be considered to be input data (e.g., input seismic data). Such a comparison demonstrates that linearly dipping noise (e.g., noise data) can be reduced while preserving desirable signal (e.g., desirable data). As mentioned, input data may be attribute data, for example, determined based at least in part on seismic data.

As an example, a method can include receiving data that includes signal data and coherent noise data where the signal data includes signal data that corresponds to a multidimensional physical structure; generating filtered data by filtering at least a portion of the data to attenuate at least a portion of the coherent noise data by applying a multidimensional geometric coherent noise model defined by at least one geometric parameter; and assessing a portion of the signal data in the generated filtered data to characterize the multidimensional physical structure.

As an example, a method can include a slope parameter as a geometric parameter. As an example, a method can include a length parameter as a geometric parameter. As an example, a method can include a slope parameter and a length parameter. As an example, a slope parameter may be an angle, which may be a dip angle.

As an example, a method can include generating filtered data with a value for a geometric parameter and generating filtered data with a different value for the geometric parameter. As an example, a method may include filtering via a model that may be defined by a plurality of geometric parameters. In such an example, filtering may be applied repeatedly where at least one value of one of the plurality of geometric parameters differs for individual applications of such filtering. As an example, a value for one filtering process may be multiplied by a negative number (e.g., negative one) and then used in another filtering process. As an example, a method can include a first filtering and at least one subsequent filtering (e.g., filtering may be repeated at least once).

As an example, a method can include receiving seismic data. In such an example, the seismic data can include variable streaming depth acquisition data. For example, consider an acquisition technique where variable streaming depth acquisition data corresponds to depth values below a water and air interface in a range from approximately zero to approximately 50 meters.

As an example, a method can include receiving data where the data includes wavelet data, for example, where the wavelets may include a maximum absolute value side lobe amplitude that is approximately an order of magnitude less than a maximum absolute value peak amplitude.

As an example, a method can include receiving seismic data and determining structural dip values for at least a portion of the seismic data and building a multidimensional geometric coherent noise model based at least in part on a portion of the structural dip values.

As an example, a method can include rendering the data to a display as a two-dimensional image where coherent noise data presents as coherent lineament noise. In such an example, the coherent lineament noise may include a portion characterizable as upgoing noise and a portion characterizable as downgoing noise.

A system can include a processor; memory operatively coupled to the processor; and one or more modules that includes processor-executable instructions stored in the memory to instruct the system where the instructions include instructions to receive data that includes signal data and coherent noise data where the signal data includes signal data that corresponds to a multidimensional physical structure; generate filtered data by filtering at least a portion of the data to attenuate at least a portion of the coherent noise data by applying a multidimensional geometric coherent noise model defined by at least one geometric parameter; and assess a portion of the signal data in the generated filtered data to characterize the multidimensional physical structure. In such an example, the at least one geometric parameter can include a slope parameter and a length parameter where the length parameter specifies a length that is greater than a vertical dimension of the multidimensional physical structure. As an example, a system can include processor-executable instructions to repeat generation of filtered data with a different value for at least one of the at least one geometric parameter.

One or more computer-readable storage media can include computer-executable instructions to instruct a computer where the instructions include instructions to receive data that includes signal data and coherent noise data where the signal data includes signal data that corresponds to a multidimensional physical structure; generate filtered data by filtering at least a portion of the data to attenuate at least a portion of the coherent noise data by applying a multidimensional geometric coherent noise model defined by at least one geometric parameter; and assess a portion of the signal data in the generated filtered data to characterize the multidimensional physical structure. In such an example, the at least one geometric parameter can include a slope parameter and a length parameter where the length parameter specifies a length that is greater than a vertical dimension of the multidimensional physical structure. As an example, a system can include instructions to repeat generation of filtered data with a different value for at least one of the at least one geometric parameter.

Figure 17:
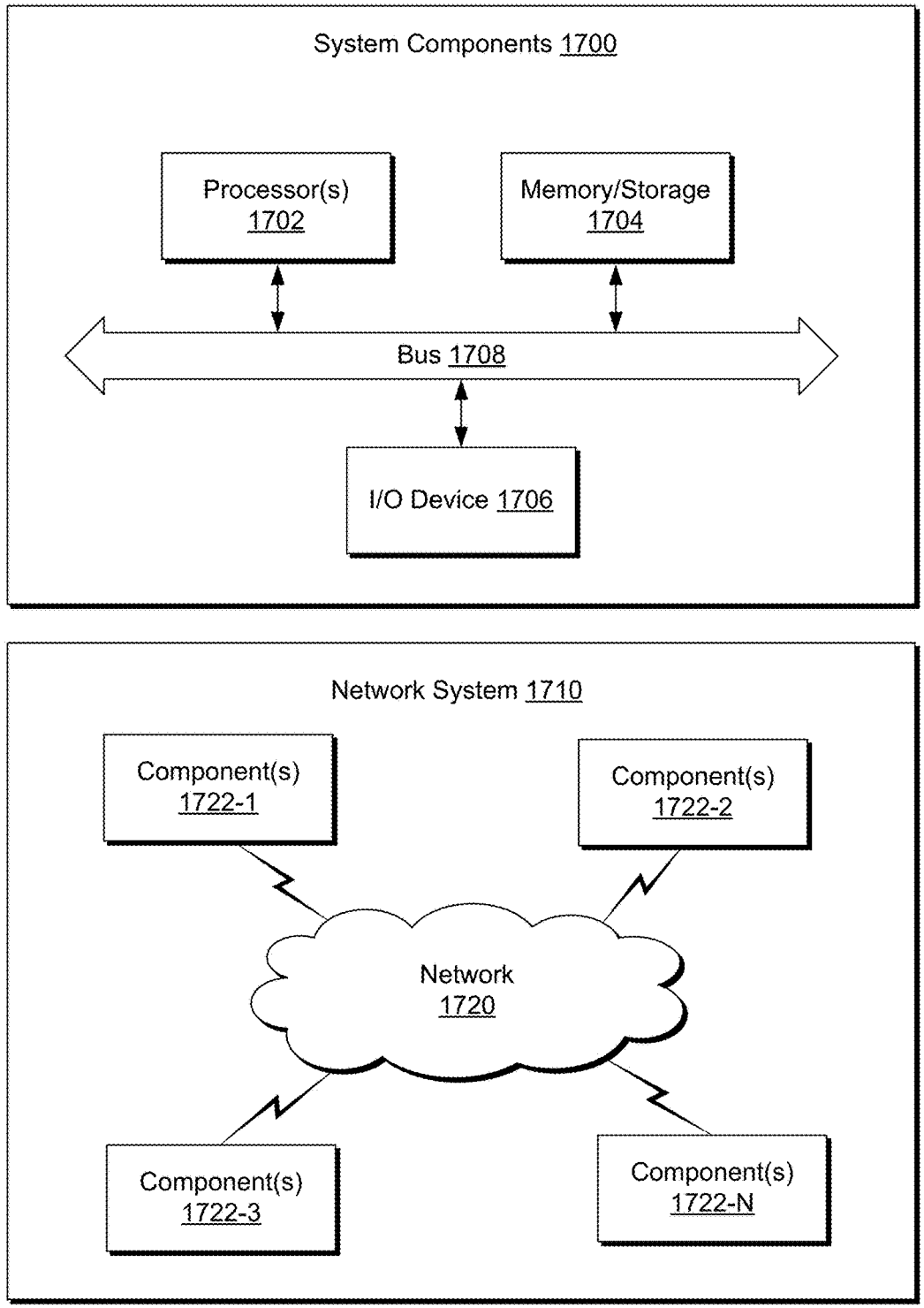
FIG. 17 illustrates example components of a system and a networked system.

FIG. 17 shows components of an example of a computing system 1700 and an example of a networked system 1710. The system 1700 includes one or more processors 1702, memory and/or storage components 1704, one or more input and/or output devices 1706 and a bus 1708. In an example embodiment, instructions may be stored in one or more computer-readable media (e.g., memory/storage components 1704). Such instructions may be read by one or more processors (e.g., the processor(s) 1702) via a communication bus (e.g., the bus 1708), which may be wired or wireless. The one or more processors may execute such instructions to implement (wholly or in part) one or more attributes (e.g., as part of a method). A user may view output from and interact with a process via an I/O device (e.g., the device 1706). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1710. The network system 1710 includes components 1722-1, 1722-2, 1722-3, . . . 1722-N. For example, the components 1722-1 may include the processor(s) 1702 while the component(s) 1722-3 may include memory accessible by the processor(s) 1702. Further, the component(s) 1702-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words "means for" together with an associated function.

What is claimed is:

1. A method comprising:
   via a computing system, receiving sensor data that comprise signal data and coherent lineament noise data wherein the signal data comprise signal data that correspond to a multidimensional physical structure;
   via the computing system, generating filtered data by filtering at least a portion of the sensor data to attenuate at least a portion of the coherent lineament noise data by applying a multidimensional geometric coherent lineament noise model that comprises at least one spatial dimension and that is defined by at least one geometric parameter; and
   via the computing system, characterizing the multidimensional physical structure by assessing a portion of the signal data in the generated filtered data.

2. The method of claim 1 wherein the at least one geometric parameter comprises a slope parameter.

3. The method of claim 1 wherein the at least one geometric parameter comprises a length parameter.

4. The method of claim 1 wherein the at least one geometric parameter comprises a slope parameter and a length parameter.

5. The method of claim 1 comprising repeating the generating with a different value for at least one of the at least one geometric parameter.

6. The method of claim 5 wherein the different value comprises a prior value multiplied by a negative number.

7. The method of claim 1 comprising repeating the generating at least once.

8. The method of claim 1 wherein the sensor data comprises seismic data.

9. The method of claim 8 wherein the seismic data comprise variable streaming depth acquisition data.

10. The method of claim 9 wherein the variable streaming depth acquisition data corresponds to depth values below a water and air interface in a range from approximately zero to approximately 50 meters.

11. The method of claim 1 wherein the sensor data comprise wavelet data wherein the wavelets comprise a maximum absolute value side lobe amplitude that is approximately an order of magnitude less than a maximum absolute value peak amplitude.

12. The method of claim 1 wherein the sensor data comprise seismic data and further comprising determining structural dip values for at least a portion of the seismic data and building the multidimensional geometric coherent noise model based at least in part on a portion of the structural dip values.

13. The method of claim 1 further comprising rendering the sensor data to a display as a two-dimensional image wherein the coherent lineament noise data present as coherent lineament noise.

14. The method of claim 13 wherein the coherent lineament noise comprises a portion characterizable as upgoing noise and a portion characterizable as downgoing noise.

15. A system comprising:
    a processor;
    memory operatively coupled to the processor; and
    one or more modules that comprise processor-executable instructions stored in the memory to instruct the system, the instructions comprising instructions to receive sensor data that comprise signal data and coherent lineament noise data wherein the signal data comprise signal data that correspond to a multidimensional physical structure;

generate filtered data by filtering at least a portion of the sensor data to attenuate at least a portion of the coherent lineament noise data by applying a multidimensional geometric coherent lineament noise model that comprises at least one spatial dimension and that is defined by at least one geometric parameter; and characterize the multidimensional physical structure via an assessment of a portion of the signal data in the generated filtered data.

16. The system of claim 15 wherein the at least one geometric parameter comprises a slope parameter and a length parameter wherein the length parameter comprises a length that is greater than a vertical dimension of the multidimensional physical structure.

17. The system of claim 15 wherein the one or more modules comprise processor-executable instructions to: repeat generation of filtered data with a different value for at least one of the at least one geometric parameter.

18. One or more computer-readable storage media comprising computer-executable instructions to instruct a computer, the instructions comprising instructions to:

receive sensor data that comprise signal data and coherent lineament noise data wherein the signal data comprise signal data that correspond to a multidimensional physical structure;

generate filtered data by filtering at least a portion of the sensor data to attenuate at least a portion of the coherent lineament noise data by applying a multidimensional geometric coherent lineament noise model that comprises at least one spatial dimension and that is defined by at least one geometric parameter; and characterize the multidimensional physical structure via an assessment of a portion of the signal data in the generated filtered data.

19. The one or more computer-readable storage media of claim 18 wherein the at least one geometric parameter comprises a slope parameter and a length parameter wherein the length parameter comprises a length that is greater than a vertical dimension of the multidimensional physical structure.

20. The one or more computer-readable storage media of claim 18 wherein the instructions comprise instructions to repeat generation of filtered data with a different value for at least one of the at least one geometric parameter.

* * * * *